(12) United States Patent
Moffat et al.

(10) Patent No.: US 12,173,683 B2
(45) Date of Patent: *Dec. 24, 2024

(54) PRESSURE-REGULATING HYDRODYNAMIC PUMP AND WAVE ENGINE

(71) Applicant: LONE GULL HOLDINGS, LTD., Portland, OR (US)

(72) Inventors: Brian Lee Moffat, Portland, OR (US); Garth Alexander Sheldon-Coulson, Portland, OR (US); Ivar Lee Thorson, Portland, OR (US); Daniel William Place, Portland, OR (US); Alexander David Chally, Portland, OR (US)

(73) Assignee: LONE GULL HOLDINGS, LTD., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,260

(22) Filed: Dec. 13, 2023

(65) Prior Publication Data

US 2024/0141864 A1     May 2, 2024

Related U.S. Application Data

(63) Continuation of application No. 18/208,875, filed on Jun. 12, 2023, now Pat. No. 11,846,265.

(60) Provisional application No. 63/401,575, filed on Aug. 27, 2022, provisional application No. 63/351,827, filed on Jun. 14, 2022.

(51) Int. Cl.
*F03B 13/22* (2006.01)
*F03B 13/06* (2006.01)
*F03B 13/14* (2006.01)

(52) U.S. Cl.
CPC .............. *F03B 13/22* (2013.01); *F03B 13/06* (2013.01); *F03B 13/142* (2013.01); *F03B 13/145* (2013.01); *F05B 2220/32* (2013.01); *F05B 2260/60* (2013.01)

(58) Field of Classification Search
CPC ........ F03B 13/22; F03B 13/06; F03B 13/142; F03B 13/145; F05B 2220/32; F05B 2260/60
See application file for complete search history.

(56) References Cited

U.S. PATENT DOCUMENTS 4,719,754 A  *  1/1988  Nishikawa ............ F03B 13/142
                                                        417/100
11,846,265 B1 * 12/2023  Moffat .................... F03B 13/24
(Continued)

*Primary Examiner* — Hoang M Nguyen
(74) *Attorney, Agent, or Firm* — Fulwider Patton LLP

(57) ABSTRACT

A pressure-regulating buoyant hydrodynamic pump is disclosed that floats adjacent to a surface of a body of water over which waves tend to pass. In response to wave-induced movements of the device, water is drawn into a mouth at a lower end of an injection tube, and water is ejected from a mouth at an upper end of the injection tube. The ejected water is deposited into an interior of the hollow buoy thereby augmenting a water reservoir therein. And water flows from the water reservoir to and through a water turbine, thereby energizing a generator, power electronics, and an electrical load. A novel water-turbine effluent buffering tube, or chamber, smooths pressure variations felt across the water turbine.

22 Claims, 22 Drawing Sheets

(56) References Cited

U.S. PATENT DOCUMENTS

| | | | |
|---|---|---|---|
| 2007/0137195 A1* | 6/2007 | Tayla | F03B 13/142 60/497 |
| 2020/0056578 A1* | 2/2020 | Sheldon-Coulson | F03B 13/145 |
| 2022/0316437 A1* | 10/2022 | Thorson | F03B 13/142 |

* cited by examiner

PRESSURE-REGULATING HYDRODYNAMIC PUMP AND WAVE ENGINE

CROSS-REFERENCES TO RELATED APPLICATIONS

This application Continuation based on U.S. Ser. No. 18/208,875, filed Jun. 12, 2023; which claims priority to U.S. Ser. No. 63/351,827, filed Jun. 14, 2022; and U.S. Ser. No. 63/401,575, filed Aug. 27, 2022, the content of which are incorporated by reference herein in their entirety.

BACKGROUND

Waves traveling across the surface of the sea tend to move relatively slowly. Likewise, the oscillations of the most energetic waves tend to have relatively long periods, e.g., on the order of eight to twenty seconds. However, despite their relatively slow movement, many waves possess and/or manifest substantial amounts of energy. It is therefore desirable to develop a practical technology to efficiently extract energy from ocean waves, e.g., and to convert wave energy into electrical power. However, the slow movements of waves has made it difficult to develop a cost-effective technology able to extract and/or convert the energy of waves. The device of the current invention improves, and/or increases, the efficiency and cost effectiveness of a wave energy conversion device disclosed in the prior art.

A hydrodynamic pump and wave engine has been previously disclosed (e.g., U.S. Pat. Nos. 10,605,226; 11,118,559). In one embodiment of that disclosed hydrodynamic pump, the hydrodynamic pump converts the energy in ocean waves into a potential energy of water stored in a gas-pressurized reservoir and then converts a portion of that potential energy into electrical power as the water flows out of the reservoir via, and/or through, a water turbine. However, the practicality and cost effectiveness of that previously-disclosed device is limited, and/or diminished, by the variability of the pressure of the water that flows into and through its water turbine, and by the device's inability to passively, i.e., without moving parts, adjust the pressure of gas within its air pocket (also referred to herein as its gas pocket) so as to control the rate at which it captures water for the purpose of maintaining a steady level and/or volume of water within its water reservoir.

The water pressure to which a water turbine responds, and from which it extracts mechanical energy, can be thought of as a difference between the pressure of water flowing into the water turbine, i.e., the water turbine's "inlet pressure," and the pressure of water resisting the outflow of, and/or pushing back against, the water turbine's effluent, i.e., the water turbine's "back pressure." Thus, the "net pressure" of a water turbine is its inlet pressure less its back pressure. The net pressure is the effective pressure of the water flowing into and through a water turbine. And variations of, and/or instabilities in, the net pressure of a water turbine may be caused by variations of, and/or instabilities in, either the inlet pressure, the back pressure, or both.

The net pressure across the water turbine of a hydrodynamic pump of the prior art tends to vary stochastically during normal operation of the pump. These variations tend to arise from at least two effects that tend to characterize the operation of such a hydrodynamic pump of the prior art. Namely, these pressure variations tend to arise from: 1) variations in the inlet pressure caused by variations in the pressure of the air pocket of the hydrodynamic pump, which, in turn, are primarily caused by the oscillation of water within its injection tube; and, 2) variations in the back pressure caused by variations in the depth of the effluent port of the hydrodynamic pump, which, in turn, are caused by the tendency of the hydrodynamic pump to bob up and down relative to the surface of a body of water as it moves up and down over, and often out of phase with, passing waves.

In order to operate efficiently, and/or cost effectively, a hydrodynamic pump, such as the one disclosed in U.S. Pat. Nos. 10,605,226; 11,118,559 (i.e., a hydrodynamic pump of the prior art) must operate across a relatively broad range of wave conditions—from relatively feeble, small, low-energy waves to relatively huge and powerful waves. Many embodiments of a hydrodynamic pump and wave engine of the prior art must include, incorporate, and/or utilize a water turbine, a generator, and a complementary set of power electronics, that are capable of operating efficiently and surviving across the full range of wave conditions that such a hydrodynamic pump may encounter.

In relatively energetic wave conditions, the injection tube of a hydrodynamic pump of the prior art will tend to eject water into its water reservoir at a relatively high flow rate. On the other hand, when the wave conditions become less energetic, the injection tube of a hydrodynamic pump of the prior art will tend to eject water into its water reservoir at a relatively lesser flow rate.

When the pressure of the gas pocket of a hydrodynamic pump of the prior art is too low with respect to the energy of the waves moving that hydrodynamic pump, then energy that might have been captured from the relatively high energy waves is wasted or lost. The pressure of the gas pocket of a hydrodynamic pump controls two factors related to the capture and conversion of hydraulic energy by a hydrodynamic pump.

First, the pressure of the gas pocket of a hydrodynamic pump establishes an energy threshold or barrier that an oscillation of water within the pump's injection tube must overcome in order to eject water from that injection tube and add water to the pump's water reservoir. When the pressure of the gas pocket is relatively high, only the most vigorous oscillations of water within a pump's injection tube will be able to overcome the energy threshold imposed by the gas pocket and add water to the water reservoir. When the pressure of the gas pocket is relatively low, many oscillations, even relatively low-energy oscillations, will be able to overcome the relatively low energy threshold imposed by the gas pocket and add water to the water reservoir.

When the pressure of the gas pocket of a hydrodynamic pump is too low relative to the wave conditions moving the pump, then ejections of water from the pump's injection tube may add water to the pump's water reservoir at a rate greater than the rate at which water flows out of the water reservoir and through the pump's water turbine, resulting in surplus water flowing back into the pump's injection tube and being lost from the standpoint of energy capture. Conversely, when the pressure of the gas pocket of a hydrodynamic pump is too high relative to the wave conditions moving the pump, then ejections of water from the pump's injection tube may fail to add water to the pump's water reservoir at a rate equal to the rate at which water flows out of the water reservoir and through the pump's water turbine, resulting in the water reservoir becoming exhausted or operating at a lower-than-optimal level.

Second, the pressure of the gas pocket of a hydrodynamic pump establishes the hydraulic potential energy of the water within the pump's water reservoir. So, the greater the pressure, the greater the potential energy of each unit of water within the water reservoir. And, conversely, the lesser the pressure, the lesser the potential energy of each unit of water within the water reservoir.

For optimal efficiency, a hydrodynamic pump requires a gas-pocket pressure that is sufficiently low to cause the wave-induced movements of the pump to add water to the pump's water reservoir, through ejections of water from the pump's injection tube water, at a rate great enough to maintain the volume of water within the water reservoir. And, for optimal efficiency, a hydrodynamic pump requires a gas-pocket pressure that is sufficiently high to prevent the wave-induced movements of the pump to add water to the pump's water reservoir, through ejections of water from the pump's injection tube water, at a rate so great that the capacity of the pump's water reservoir is exceeded and water from the reservoir flows back into the injection tube and is thereby wasted or lost. In summary, for optimal efficiency, a hydrodynamic pump requires a gas-pocket pressure that is as high as possible while providing sufficient additions of water to the pump's water reservoir to maintain the volume of water within the water reservoir and replace the water flowing out of the water reservoir through the pump's water turbine.

By increasing the number of moles of air in, and thereby the pressure of, the air pocket of a hydrodynamic pump, the resting free surface of the water within the pump's injection tube is pushed down, and more powerful oscillations of the hydrodynamic pump are required, on average, to eject water from the injection tube and into the pump's water reservoir. At the same time, because the pressure of the pump's air pocket is increased, so too is the hydrostatic potential energy of the water that is within the pump's water reservoir. So, even though increasing the pressure of the air pocket reduces the rate of flow of water from a pump's injection tube and into the pump's water reservoir, the water that does flow into, and reside within, the hydrodynamic pump's water reservoir, and which thereafter flows into, through, and out of, the pump's water turbine, possesses an increased amount of head pressure and potential energy.

By increasing the pressure of the air pocket of a hydrodynamic pump, the rate at which water flows from the injection tube of the pump and into the pump's water reservoir is decreased, so as to better match the rate at which it flows out of the hydrodynamic pump, and back to the body of water on which the pump floats, through the pump's water turbine. Despite the maintenance of a nominal rate of water flow into and through the water turbine, the turbine is able to produce greater torque and its operatively connected generator is able to produce more electrical power and thereby energize relatively larger electrical loads.

By contrast, by decreasing the number of moles of air in, and thereby the pressure of, the air pocket of a hydrodynamic pump, the resting free surface of the water within the pump's injection tube is allowed to rise to a level closer to the upper mouth of the tube, and less powerful oscillations of the hydrodynamic pump are sufficient to eject water from the pump's injection tube and into the pump's water reservoir. At the same time, because the pressure of the pump's air pocket is reduced, so too is the hydrostatic potential energy of the water within the water reservoir. So, even though decreasing the pressure of the air pocket increases the rate of flow of water into a hydrodynamic pump's water reservoir, the water that does flow into, and reside within, the pump's water reservoir possesses a reduced amount of head pressure and potential energy.

By decreasing the pressure of the air pocket of a hydrodynamic pump, the rate at which water flows from the injection tube of the pump and into the pump's water reservoir is increased, so as to better match the rate at which it flows out of the hydrodynamic pump, and back to the body of water on which the pump floats, through the pump's water turbine. Furthermore, the reservoir free surface tends to be closer to the spout of the injection tube, and therefore less energy is wasted as water falls from the spout of the injection tube to the reservoir free surface.

The adjustment of the pressure of a hydrodynamic pump's air pocket can adjust the rate at which water flows into the pump's water reservoir thereby permitting the pump to maintain a constant and/or a desirable rate of water flow into and through the pump's water turbine. However, amount of power that a pump's water turbine can extract from the water flowing therethrough increases and decreases with the concomitant increases and decreases in the pressure of the pump's air pocket.

Water turbines, as well as the operatively connected generators those water turbines energize, and the respective power conditioning and electrical load circuits through which the generated electrical power flows, by which a portion of that generated electrical power is consumed, tend to be relatively simple and relatively inexpensive when the respective water turbines are energized by water flows of relatively constant, steady, and/or consistent pressure. However, the pressures of the water flows by which water turbines of hydrodynamic pumps of the prior art are energized tend to be dynamic, noisy, unsteady, and even chaotic, often manifesting relatively large and/or significant swings in pressure.

The relatively rapid fluctuations in the net pressure of a hydrodynamic pump of the prior art which are caused by corresponding fluctuations in the gas pressure of the pump's air pocket, and fluctuations in the depth of the pump's effluent port, represent significant operational challenges which limit the cost effectiveness, and power-production efficiencies, of hydrodynamic pumps of the prior art.

If the pressures of the water flows which energize the water turbines of hydrodynamic pumps could be made more steady and stable, then the costs associated with the fabrication and operation of those hydrodynamic pumps could be significantly reduced and/or improved. Moreover, if the pressures of the water flows which energize the water turbines of hydrodynamic pumps could be made more steady and stable, then the operational reliabilities and lifetimes of those hydrodynamic pumps could be significantly increased and/or improved.

A hydrodynamic pump of the prior art is unable to alter or adjust the gas pressure of its air pocket passively, i.e., without the use of mechanisms having moving parts and limited operational lifetimes such as electrical air pumps. Relying on the use of mechanical pumps (i.e., those having moving parts) to adjust, alter, and/or change the gas pressure of a hydrodynamic pump's air pocket also requires a suite of sensors and a control system to determine when to enable a mechanical pump (to add air to the air pocket) or a complementary mechanical valve (to release air from the air pocket). And, such sensors and control systems represent additional complexities, costs, and potential points of failure. Without a passive autonomous air-pocket pressure adjustment system, i.e., a system lacking moving parts and the need for a control system, the reliability, cost effectiveness, and power-production efficiencies, of hydrodynamic pumps of the prior art are limited.

It is typically the case that the greater the range of a water turbine's net pressure:

the greater the complexity and the lower the hydraulic efficiency of the water turbine's rotor (and turbine blades);

the greater the complexity and cost of the generator operatively connected to the water turbine, e.g., it must be capable of operating at the highest net pressures as well operating at the lowest;

the greater the complexity and cost of the power-conditioning electronics needed to process and manage the electrical power generated by the operatively connected generator; and, the greater the complexity and cost of the electrical loads and/or payloads adapted to perform useful work, e.g., across a wide range of fluctuating electrical power levels.

The cost and complexity of a hydrodynamic pump may be reduced, and its reliability and efficiency may be increased, if the range of net pressures over, across, and/or through which, the hydrodynamic pump must operate can be reduced, and if the magnitudes of individual fluctuations in net pressure can also be reduced.

For at least the above-mentioned reasons, there exists a need for a hydrodynamic pump which has a relatively stable net pressure across its water turbine and which can automatically adjust the pressure of its air pocket to a pressure that is optimal with respect to any given and/or particular wave condition that it might encounter.

SUMMARY OF THE INVENTION

Disclosed is an improved and more efficient buoyant hydrodynamic pump of a type disclosed in U.S. Pat. No. 10,605,226.

The hydrodynamic pump of the prior disclosure, and/or the prior art, comprises, in part, a hollow and buoyant buoy portion which floats adjacent to an upper surface of a body of water over which waves pass. Attached to, and depending from, the buoy is a injection tube with at least two mouths, apertures, orifices, and/or openings. One mouth is positioned at an upper end of the injection tube. The second mouth is positioned at a lower end of the injection tube.

In response to wave-induced movements of the hydrodynamic pump, water within the injection tube tends to move up and down within the tube. When the water moves upward within the injection tube, it tends to collide with a constriction therein, which obstructs and/or resists, the upward flow, and/or surge, of water, thereby tending to cause a localized increase in a pressure, an upward speed, and/or an upward acceleration, of the upflowing water, under the effect of the significant inertance of said water.

Periodically, the constriction-accelerated water moving upward within the injection tube moves up with enough speed, momentum, and/or energy, and/or to a great enough height, to send a portion of that water up and through the upper mouth of the injection tube, thereby depositing a portion of that ejected water into a water reservoir within a lower portion of the interior of the hollow buoy.

A pocket of air (or other gas) within an upper portion of the interior of the hollow buoy, and positioned above and in fluid communication with the water reservoir therein, pushes the mean, average, and/or resting level, and/or free surface, of the water within the injection tube to a depth below that of the surface of the body of water on which the hydrodynamic pump floats. The greater the pressure of the gas within the air pocket, the greater the depth to which the mean, average, and/or resting free surface of the water within the injection tube is pushed. And the greater the depth to which the resting free surface of the water within the injection tube is pushed, the more vigorous and energetic is the wave-induced movement of the respective hydrodynamic pump that is required to cause an ejection of water from the upper mouth of the injection tube and into the water reservoir.

Disclosed herein are two improvements to a hydrodynamic pump of the prior art, and/or two novel hydrodynamic-pump features, structures, and/or fluid channels. The first novel hydrodynamic-pump feature, i.e., an "effluent buffer chamber," significantly stabilizes short-term, and/or transient, swings in net pressure of water flowing from the hydrodynamic pump's water reservoir, and into and through its water turbine. Such transient, swings in net pressure negatively impact the operation of the pump's water turbine, reduce its efficiency, and increase the cost and complexity of the associated generator and power-conditioning electronics. The second novel hydrodynamic-pump feature, i.e., a "reservoir pressure-stabilizing trompe," continuously adjusts the average pressure of the pump's air pocket so as to maintain an optimal rate of water effluence from the pump's injection tube, and to maintain an optimal rate of water addition to the water-reservoir, even when changes in an ambient sea state would alter the rate at which water flows from the pump's injection tube into the water reservoir.

Water effluent flowing out the water turbine of a hydrodynamic pump of the prior art flows directly into the body of water surrounding the pump, i.e., the body of water on which it floats. However, water effluent flowing out the water turbine of a hydrodynamic pump of the present disclosure flows into an effluent buffer chamber, and from therein then flows into the body of water outside the hydrodynamic pump.

The effluent buffer chamber of a hydrodynamic pump of the present disclosure is fluidly connected: to the pump's air pocket via an aperture at an upper end of the effluent buffer chamber; to the pump's water turbine (i.e., to its effluent) via an effluent pipe and/or port and/or draft tube of the water turbine; and to the body of water on which the pump floats via a drain and/or drain aperture of the effluent buffer chamber.

When moved by the passage of ambient waves, water within the injection tube of a hydrodynamic pump oscillates up and down. Each such oscillation changes the volume of the air pocket to which the upper end of the injection tube is fluidly connected. Such changes in the volume of a hydrodynamic pump's air pocket alter the pressure of the air (or other gas) therein.

When the pressure of the air pocket of a hydrodynamic pump of the prior art increases, decreases, and/or changes, that change in the air-pocket pressure produces an approximately equal change in the inlet pressure of the pump's water turbine. Such a change in the inlet pressure of the pump's water turbine tends to cause an equal change to the net pressure thereof, which results in a change in the mechanical power transmitted by the water turbine to the hydrodynamic pump's operatively connected generator, and thereby results in a change to the electrical power produced by the generator, and which thereby results in a change to the electrical power sent to the pump's electrical load.

Similarly, when the pressure of the air pocket of a hydrodynamic pump of the present disclosure increases, decreases, and/or changes, that change in the air-pocket pressure produces an approximately equal change in the inlet pressure of the pump's water turbine. However, with respect to a hydrodynamic pump of the present disclosure, any such increase, decrease, and/or change, in the pressure of a pump's air pocket, produces an equal change in the pressure of the water within the effluent buffer chamber to which is fluidly connected (and on which it acts via the latter's free surface). A change in pressure of the air pocket of a hydrodynamic pump of the present disclosure produces an equal change in the pressure of the water within the pump's effluent buffer chamber. Such a change in the pressure of the water within the effluent buffer manifests an equal change in the pressure resisting the flow of effluent from the pump's water turbine, i.e., in the "back pressure" of the water turbine.

Since increases, decreases, and/or changes, in the pressure of a pump's air pocket cause approximately equal changes in both the inlet pressure and the back pressure of the pump's water turbine, the water turbine's "net pressure" tends to not change, at least to an approximate degree—thus eliminating one of the sources of pressure and power instability characteristic of the hydrodynamic pump of the prior disclosure.

When the depth and/or draft of a hydrodynamic pump of the prior art increases, decreases, and/or changes, so too does the depth of, and hydrostatic back pressure at, the effluent pipe and/or port and/or draft tube of the water turbine. Such a change in the back pressure of the pump's water turbine tends to cause an equal and opposite change to the net pressure thereof.

For instance, an increase in the depth of a hydrodynamic pump of the prior art causes an increase in the back pressure at the effluent pipe and/or port of the water turbine, which decreases the net pressure of the water turbine—which, in turn, decreases the mechanical power transmitted from the water turbine to its operatively connected generator, decreases the amount of electrical power produced by the generator, and decreases the amount of electrical power provided to the hydrodynamic pump's electrical load.

And, in similar fashion, a decrease in the depth of a hydrodynamic pump of the prior art causes a decrease in the back pressure at the effluent pipe and/or port of the water turbine, which increases the net pressure of the water turbine—which, in turn, increases the mechanical power transmitted from the water turbine to its operatively connected generator, increases the amount of electrical power produced by the generator, and increases the amount of electrical power provided to the hydrodynamic pump's electrical load.

Rapid increases and decreases in the mechanical power transmitted from the water turbine to its operatively connected generator can damage the generator. Rapid increases and decreases in the amount of electrical power provided to the hydrodynamic pump's electrical load can damage the load. Mitigating these potential sources of damage to a hydrodynamic pump of the prior art is difficult and requires added mechanical and electronic complexity and cost.

When the depth of a hydrodynamic pump of the present disclosure increases, decreases, and/or changes, so too does the depth of, and hydrostatic back pressure at, the drain aperture of the pump's effluent buffer chamber. When the depth of a hydrodynamic pump of the present disclosure increases, so too does the hydrostatic back pressure at the drain aperture of the pump's effluent buffer chamber, and so too does the degree to which that hydrostatic back pressure opposes a flow of water out of the drain aperture of the pump's effluent buffer chamber, i.e., water will flow more slowly out of the effluent buffer. Similarly, when the depth of a hydrodynamic pump of the present disclosure decreases, so too does the hydrostatic back pressure at the drain aperture of the pump's effluent buffer chamber, and so too does the degree to which that hydrostatic back pressure opposes a flow of water out of the drain aperture of the pump's effluent buffer chamber, i.e., water will flow more quickly out of the effluent buffer. However, the hydrostatic back pressure at the effluent pipe and/or port of the hydrodynamic pump's water turbine is not a direct consequence of the relative depth of, and back pressure at, the aperture of the pump's effluent buffer chamber; it is, instead, a consequence of the relative depth of the water turbine's effluent pipe and/or port relative to the free surface of the water within the effluent buffer chamber (plus, as mentioned above, the added pressure of the air above said effluent-buffer water). For this reason, the back pressure and the related net pressure of the water turbine of a hydrodynamic pump of the present disclosure tends to be insulated, at least transiently, temporarily, briefly, and/or momentarily, from the disruptive impact of increases in the depth of the hydrodynamic pump.

When the depth of the hydrodynamic pump of the present disclosure increases, water from outside the hydrodynamic pump will tend to flow into the effluent buffer chamber, thereby gradually, and/or incrementally, raising the height of its free surface above, or further above, that of the effluent pipe and/or port of the water turbine. As the free surface of the water within the effluent buffer chamber rises, the back pressure exerted by the water within that effluent buffer chamber against the effluent pipe and/or port of the water turbine will increase. And, if the increase in depth of the hydrodynamic pump of the present disclosure were to persist for a long enough period, then the water within the effluent buffer chamber would eventually exert the same amount of back pressure on the water turbine as would the water outside the hydrodynamic pump. However, even if the only benefit of the effluent buffer chamber were to slow down an inevitable increase in a depth-related back pressure at the water turbine of a hydrodynamic pump, that would still reduce the mechanical fatigue, and cost of electronics, required by a hydrodynamic pump to mitigate the disruptive effects of more rapid increases in back pressure.

Because the (transverse) cross-sectional area of the drain aperture of the effluent buffer chamber is relatively small in comparison to the (horizontal) cross-sectional area of the effluent buffer chamber, the rate at which water can flow into the effluent buffer chamber and raise the free surface of the water therein is reduced and/or limited, as is the consequent rate at which the back pressure exerted by the water within that effluent buffer chamber against the effluent pipe and/or port of the water turbine can increase. Often, before any significant increase in the back pressure exerted by the water within that effluent buffer chamber against the water turbine effluent pipe and/or port can occur, the depth of the hydrodynamic pump will decrease (as it continues bobbing in response to the passage of waves) and the inflow of water through the drain of the effluent buffer chamber will reverse.

Thus, with respect to wave-induced increases in the depth of a hydrodynamic pump of the present disclosure, the effluent buffer chamber insulates, at least to a degree, and at least for a short period of time, the disruptive effects of those increases in depth with respect to the net pressure of the respective water turbine. When the depth of the hydrodynamic pump of the present disclosure decreases, water from within the effluent buffer chamber will tend to flow out into the body of water outside the hydrodynamic pump, thereby gradually, and/or incrementally, lowering and/or reducing the height of its free surface above, or further above, that of the effluent pipe and/or port of the water turbine. As the free surface of the water within the effluent buffer chamber falls, the back pressure exerted by the water within that effluent buffer chamber against the effluent pipe and/or port of the water turbine will decrease. And, if the decrease in depth of the hydrodynamic pump of the present disclosure were to persist for a long enough period, then the water within the effluent buffer chamber would eventually exert the same reduced amount of back pressure on the water turbine as would the water outside the hydrodynamic pump. However, even if the only benefit of the effluent buffer chamber were to slow down an inevitable decrease in a depth-related back pressure at the water turbine of a hydrodynamic pump, that would still reduce the mechanical fatigue, and cost of electronics, required by a hydrodynamic pump to mitigate the disruptive effects of more rapid decreases in back pressure.

Because the (transverse) cross-sectional area of the drain aperture of the effluent buffer chamber is relatively small in comparison to the (horizontal) cross-sectional area of the effluent buffer chamber, the rate at which water can flow out of the effluent buffer chamber and lower the free surface of the water therein is reduced and/or limited, as is the consequent rate at which the back pressure exerted by the water within that effluent buffer chamber against the effluent pipe and/or port of the water turbine can diminish. Often, before any significant reduction in the back pressure exerted by the water within that effluent buffer chamber against the water turbine effluent pipe and/or port can occur, the depth of the hydrodynamic pump will increase (as it continues bobbing in response to the passage of waves) and the outflow of water through the drain of the effluent buffer chamber will reverse.

Thus, with respect to wave-induced decreases in the depth of a hydrodynamic pump of the present disclosure, the effluent buffer chamber insulates, at least to a degree, and at least for a short period of time, the disruptive effects of those decreases in depth with respect to the net pressure of the respective water turbine.

Trompes of the prior art direct a source of steadily flowing water, flowing at a first elevation, into a vertical first water pipe, and/or channel, whereinafter it flows in a downward direction. The vertical first water pipe carries the down-flowing and/or falling water to a second lower elevation and directs it to flow into a horizontal second pipe. The horizontal second pipe carries the water laterally for a distance after which the second pipe directs the water to flow into a vertical third pipe where it flows upward. The third pipe then carries the water back to a third elevation, which elevation is greater than the second elevation, but less than the first elevation, at which point the water is released back into the environment.

At a point along the length of the first pipe, wherein water is rapidly flowing downward, and at a point that is typically adjacent to, and/or just below, the first elevation, an aperture allows atmospheric air to be drawn into the downward-falling water, thereby tending to create a mixture of water and entrained air bubbles. The mixture of air and water flows downward through the first pipe at a speed greater than the speed at which the bubbles would ascend in the absence of a downward current. The downward-flowing mixture of air and water eventually reaches and flows into the second pipe. The horizontal second pipe, typically called a "separation gallery," is typically of a larger diameter than the first pipe. The larger diameter of the second pipe tends to cause the flow of water and air therein to slow relative to its speed of flow through the first pipe. This reduction in flow speed tends to allow a portion of the air bubbles in the water flowing through the second pipe to coalesce and rise to an upper side of the second pipe. The water within the second pipe thereafter tends to continue flowing into and through the third pipe, and then out of the trompe. However, a portion of coalesced air remaining within the second pipe tends to flow up and into a vertical air pipe connected to an upper side of the second pipe.

Because of its presence and/or entrainment within a stream of water having a head pressure no less than the water head pressure created by, and/or a consequence of, the relative vertical distance between the second pipe and the upper end of the third pipe, the air within the air pipe is compressed and has a pressure similar to that of the water head pressure.

Unlike trompes of the prior art, the novel trompe of the present disclosure is driven by a fluid stream whose gravitational head pressure is augmented, and/or increased, by the pressure of the very air pocket to which it supplies air, a pressure which tends to progressively and/or incrementally increase and/or rise in response to the trompe's addition of air to that air pocket. Furthermore, the trompe of the present disclosure removes, and/or allows the escape of, air from a fluidly connected air pocket when the pressure of that air pocket is, and/or becomes, excessive. Unlike trompes of the prior art, the operation of the trompe of the present disclosure is indirectly and/or passively regulated and/or controlled by the very pocket of air which it augments through its pumping of air.

When the level of water within the water reservoir of a hydrodynamic pump of the present disclosure is above an upper mouth of a nominally vertical air ingestion pipe, then water from the pump's water reservoir flows into and through the air ingestion pipe, which causes atmospheric air to be captured and pumped into the pump's effluent buffer where it rises to join and/or augment the pressurized air pocket within the hydrodynamic pump. And the addition of air to the pump's air pocket, and the consequent increase in the pressure of that air pocket, slows the addition of water to the water reservoir (resulting from a reduction in the frequency of ejections of water from the upper mouth of the pump's injection tube). When the level of water within the water reservoir of a hydrodynamic pump of the present disclosure is below the upper mouth of the air ingestion pipe, then pressurized air from the pump's air pocket is able to escape from the pump thereby lowering the pressure of the air pocket. And the removal of air from the pump's air pocket, and the consequent reduction in the pressure of that air pocket, increases the addition of water to the water reservoir (resulting from an increase in the frequency of ejections of water from the upper mouth of the pump's injection tube).

When the level of water within the water reservoir of a hydrodynamic pump of the present disclosure is, or becomes, too high, and/or the level of the water within the hydrodynamic pump's water reservoir is above a target maximal, and/or threshold, water level, a portion of the water above the water reservoir's target maximal water level flows into an upper mouth of the nominally vertical air ingestion pipe. The lower mouth of the air ingestion pipe discharges water flowing from the air ingestion pipe into the effluent buffer. The water flowing from the water reservoir into the air ingestion pipe flows under the combined hydraulic (head) pressure of the water reservoir from which it flows, as well as the gas pressure of the air pocket above the water reservoir. The effluent water flowing out of the air ingestion pipe and into the effluent buffer is resisted by back pressure approximately equal to that of the hydrostatic pressure of the water outside the hydrodynamic pump (at the depth that the lower mouth of the air ingestion pipe would have if exposed directly to the body of water outside the pump, instead of being exposed to the buffered hydrostatic pressure within the effluent buffer. Because the pressure of the water entering the air ingestion pipe is greater than the pressure resisting its effluent at its lower mouth, water flows downward through the air ingestion pipe with significant force and speed.

The pressurized water flowing into and through the air ingestion pipe enables atmospheric air to be drawn into that stream of water when the pressurized water speeds up as it flows through a constriction in the air ingestion pipe which significantly lowers its static pressure and causes atmospheric air to be drawn into that stream of water as bubbles.

Between the upper and lower mouths of the air ingestion pipe, the air ingestion pipe is fluidly connected to the atmosphere via an air supply pipe fluidly connected to the air ingestion pipe at a "water-air mixture junction." Through the air supply pipe, atmospheric air may be sucked into the water within the air ingestion pipe as it flows downward within and/or through that air ingestion pipe. Atmospheric air is sucked into the water within the air ingestion pipe when the pressure of that flowing water is and/or becomes sufficiently low (e.g., when the pressure of that water is and/or becomes less than the pressure of the atmosphere outside the respective hydrodynamic pump) during its passage through the constriction in the air ingestion pipe. Below the water-air mixture junction, the water flowing downward within the air ingestion pipe is and/or becomes a combination of water and air bubbles.

The water/air mixture created at the water-air mixture junction flows downward through the air ingestion pipe until it reaches, and enters the effluent buffer chamber of a hydrodynamic pump of the present disclosure. An upper aperture of the hydrodynamic pump's effluent buffer chamber fluidly connects an interior the effluent buffer chamber to the air pocket of the hydrodynamic pump. Within the effluent buffer chamber, the air bubbles that flow out of the lower mouth of the air ingestion pipe rise, some coalescing into larger bubbles, until they breach the free surface of the water within the effluent buffer chamber. Thereafter those bubbles of air join the air pocket of the hydrodynamic pump and increase the pressure of that air pocket.

By contrast, when the level of water within the water reservoir of a hydrodynamic pump of the present disclosure is, or becomes, too low, and/or the level of the water within the hydrodynamic pump's water reservoir is below a target and/or threshold water level, water from the water reservoir is unable to flow into the inlet aperture of the air ingestion pipe. And, when water is unable to flow, stops flowing, and/or no longer flows, into the upper mouth of the air ingestion pipe of a hydrodynamic pump of the present disclosure, the free surface of the water within that pipe falls as the water remaining within the air ingestion pipe continues flowing downward, e.g., continues being forced downward by the pressure of the pump's air pocket. In the absence of water flowing into the air ingestion pipe from the water reservoir, the free surface of the water within that air ingestion pipe will fall to approximately the same level as the free surface within the effluent buffer. This "arrested flow" free surface level of the air ingestion pipe is below the water-air mixture junction from which atmospheric air is drawn into the air ingestion pipe.

When the level of water within the air ingestion pipe falls below, and/or has fallen to, and/or below, the water-air mixture junction, which fluidly connects the water and air supply pipes, then air from a hydrodynamic pump's air pocket is able to flow into and through the air supply pipe, and therethrough flow from the pump's air pocket to the atmosphere. This outflow of air from the air pocket reduces the pressure of the air pocket, which allows and/or causes the free surface of the water within the pump's injection tube to rise, thereby enabling relatively low—and/or lower-energy waves to provoke ejections of water from the pump's injection tube and into the pump's water reservoir. Thus, the exposure of the air supply pipe to the air of the pump's air pocket, and the resulting reduction in the pressure of that air pocket, tends to cause the rate and/or frequency at which water flows from the injection tube and into the water reservoir to increase.

When an increased flow of water from the injection tube of a hydrodynamic pump to and/or into the pump's water reservoir has restored the level of water within that water reservoir to a level at least slightly greater than the water reservoir's target water level, then water from the water reservoir will again flow into the inlet aperture of the air ingestion pipe, thereby raising the level of water within the air ingestion pipe to a level above the water-air mixture junction, and thereby preventing any further venting of air from the pump's air pocket to the atmosphere, and any further reduction in the pressure of the pump's air pocket.

In a relatively stable wave condition, water from the water reservoir of a hydrodynamic pump of the present disclosure will tend to rise to a level at which its water flows into and through the air ingestion pipe, drawing atmospheric air into the pump's air pocket, thereby reducing the rate and/or frequency at which water is added to the water reservoir. At this point, water from the water reservoir of the hydrodynamic pump of the present disclosure will tend to fall (as it flows back into the body of water through the pump's water turbine) to a level at which its water is no longer able to flow into the air ingestion pipe, thereby allowing air from the pump's air pocket to flow back into the atmosphere and reduce the pressure of the air pocket. And at this point, water from the water reservoir of the hydrodynamic pump of the present disclosure will tend to rise (as the rate and frequency of water flowing from the pump's injection tube into the water reservoir increases) until it again reaches a level at which its water flows into and through the air ingestion pipe, drawing atmospheric air into the pump's air pocket, thereby reducing the rate and/or frequency at which water is added to the water reservoir. This cycle will tend to continue and will tend to result in a stable level of water within the water reservoir of a hydrodynamic pump of the present disclosure.

When the level of water within the water reservoir of hydrodynamic pump of the present disclosure is above an inlet aperture, i.e., above a target and/or threshold reservoir water level, then the trompe of the present disclosure consumes hydraulic power, and water from the water reservoir, of the hydrodynamic pump in order to draw air from the atmosphere, pressurize that air, and add the resulting pressurized air to the pressurized air pocket within the hydrodynamic pump. The increased pressure of the pump's air pocket then reduces the rate of water flow from the pump's injection tube into the water reservoir. Conversely, when the level of water within the water reservoir of a hydrodynamic pump of the present disclosure is below the inlet aperture, i.e., below the target and/or threshold reservoir water level, then the trompe of the present disclosure does not consume hydraulic power, or water, from the pump's water reservoir, and instead vents air from the air pocket of the hydrodynamic pump to the atmosphere. The decreased pressure of the pump's air pocket then increases the rate of water flow from the pump's injection tube into the water reservoir. In such a manner, the improved hydrodynamic pump of the present disclosure, which incorporates a reservoir pressure-stabilizing trompe, is able to regulate its internal air pressure and reservoir water level, in a manner which is stable (returning to equilibrium if perturbed, and changing the air pressure to adapt to changed wave conditions).

The reservoir pressure-stabilizing trompe of the present disclosure is one element of a regulatory system and/or loop in which the pressure of a pocket of air regulates the rate at which water flows into a reservoir of water. An excessive level of water within the pump's water reservoir causes an operatively connected and/or coupled reservoir pressure-stabilizing trompe, fed by water from the water reservoir, to add air to the pocket of air, thereby increasing the pressure of that pocket of air, and thereby suppressing and/or reducing the rate at which water flows into the reservoir of water. Whereas a deficit, deficient, and/or inadequate, level of water within the pump's water reservoir causes the operatively connected and/or coupled reservoir pressure-stabilizing trompe to run dry thereby releasing and/or venting air from the pocket of air, thereby reducing the pressure of that pocket of air, and thereby increasing the rate at which water flows into the reservoir of water.

Disclosed herein is a self-regulating water reservoir of which one element is comparable and/or similar, to a trompe of the prior art, but which incorporates, manifests, and/or includes, features, characteristics, behaviors, and benefits, not found in the prior art. Such features include an inlet aperture configured to be fed by a flow of water whose rate of inflow is regulated by the level of water within the water reservoir of the hydrodynamic pump; an inlet aperture configured to be fed alternatingly by a flow of water from the water reservoir when the level of water within the water reservoir is excessive (which causes the reservoir pressure-stabilizing trompe to add air to the air pocket from the external atmosphere), and by a flow of air from the air pocket when the level of water within the water reservoir is insufficient (which vents air-pocket air via the reservoir pressure-stabilizing trompe); and a recurrent design that causes air pumped and/or added by the reservoir pressure-stabilizing trompe to be fed to, and thereby to increase the pressure of, the very air pocket that impels water through the reservoir pressure-stabilizing trompe.

By alternately adding air to the air pocket of a hydrodynamic pump of the present disclosure, and removing air from the air pocket of that hydrodynamic pump of the present disclosure, the self-regulating water reservoir disclosed herein adjusts, adapts, maintains, tunes, and/or optimizes, the air pressure of a hydrodynamic pump's air pocket in order to match the rate at which water flows from the pump's injection tube to the pump's water reservoir, with, and/or to, the rate at which water flows from the pump's water reservoir to and through the pump's water turbine.

A preferred embodiment of the present disclosure is characterized by a waterplane area that is at least five times greater than the average horizontal cross-sectional area of the upper surface of the resting water partially enclosed within the embodiment's injection tube. A preferred embodiment of the present disclosure is characterized by an injection tube that is a constricted tube, e.g., the lower mouth of the tube has a greater (flow-normal) cross-sectional area than the upper mouth of the tube, and the tube incorporates at least one converging section. A preferred embodiment of the present disclosure is characterized by a buoy that is quasi-spherical especially in the region of a resting waterline. A preferred embodiment of the present disclosure is free-floating, unmoored, self-propelled, and possessing computing devices that are used to process computational tasks transmitted to it by a satellite, or by other electromagnetically- or optically-encoded signals, so that it can perform computational tasks on demand and/or autonomously, far from any shore and/or in the midst of waves that tend to be more energetic than those found near shore. Another preferred embodiment of the present disclosure promotes the growth of fish, macroalgae, microalgae, bivalves, and/or other organisms, within a respective reservoir of the device, sometimes by using a portion of the energy that the embodiment generates to generate light to support their growth and/or to propel the device to locations offering favorable environmental and/or nutritional resources. Another preferred embodiment of the present disclosure captures minerals dissolved in seawater by using the pumping action of the embodiment to drive water at elevated pressure through or adjacent to an adsorbent or absorbent capture medium. Another preferred embodiment of the present disclosure uses the water-pumping action of the embodiment to circulate water in order to create a hospitable and waste-free environment for fish captive within a reservoir of the embodiment. Another preferred embodiment of the present disclosure uses generated electrical energy to electrolyze water, or an aqueous solution (e.g., an alkaline water solution), to produce hydrogen gas. Finally, another preferred embodiment of the present disclosure uses its water-pumping action to propel seawater skywardly to increase the number of cloud nucleation sites in the air above the embodiment.

DETAILED DESCRIPTIONS OF THE PREFERRED EMBODIMENTS

For a fuller understanding of the nature and objects of the invention, reference should be made to the preceding detailed description, taken in connection with the accompanying drawings. The following figures offer explanatory illustrations of the present disclosure. The following figures, and the illustrations offered therein, in no way constitute limitations, either explicit or implicit, of the present invention.

Figure 1:
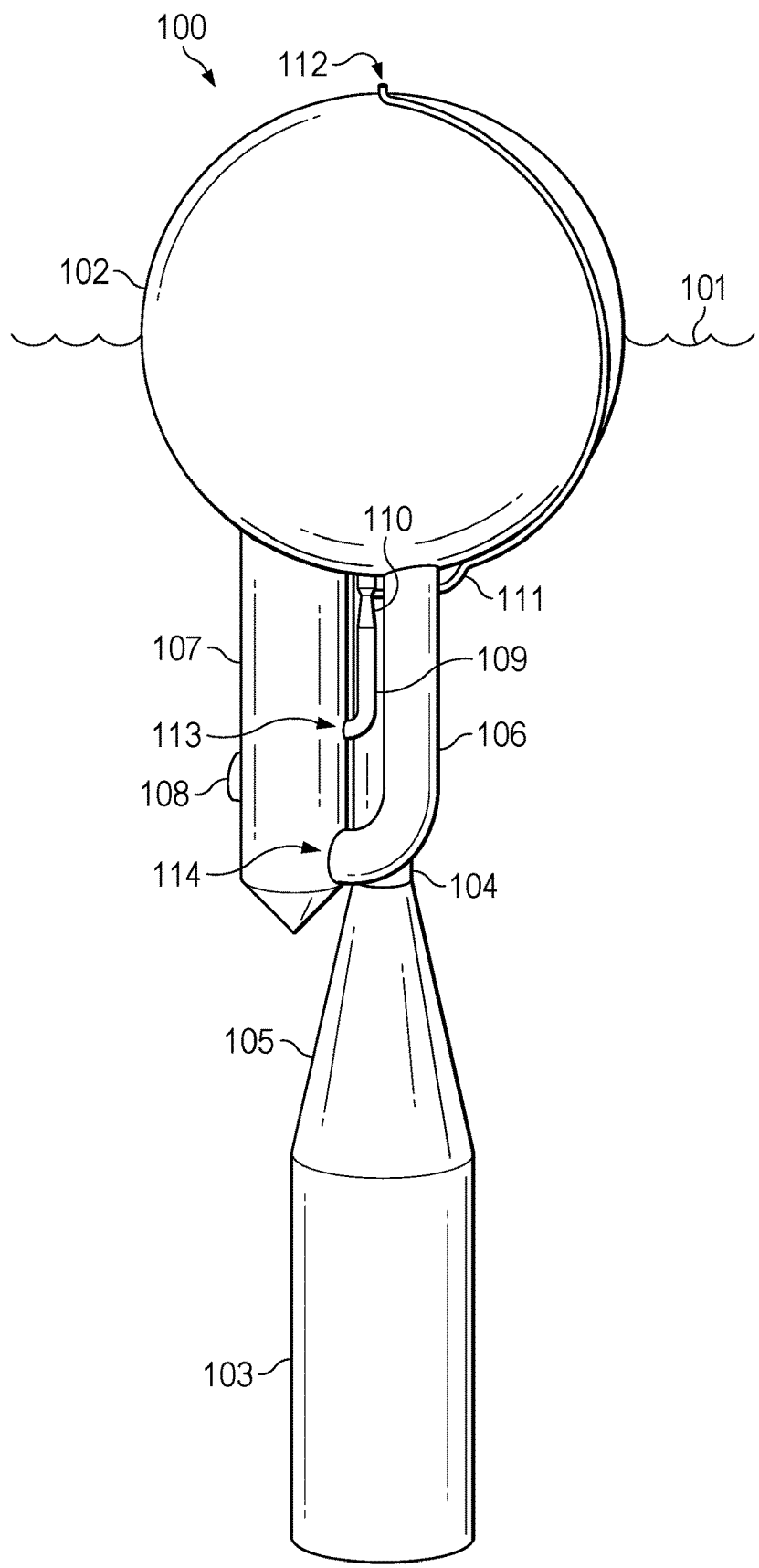
FIG. 1 is a side perspective view of a first embodiment of the present invention.

FIG. 1 illustrates a side perspective view of an embodiment 100 of the current hydrodynamic-pump disclosure. The embodiment floats adjacent to an upper surface 101 of a body of water over which waves tend to pass. The embodiment comprises a hollow buoyant enclosure 102, and/or buoy, and an attached injection tube 103-105, comprised of three sections. A bottommost, approximately cylindrical section 103 of the injection tube is characterized by a relatively large diameter and cross-sectional area. An uppermost approximately cylindrical section 104 of the injection tube is characterized by a relatively small, and/or smaller, diameter and cross-sectional area. And a middle section 105 of the injection tube is characterized by a constricted, narrowing, sloped, and/or frustoconical, portion of the tube which fluidly connects the uppermost 104 and lowermost 103 approximately cylindrical sections, and wherein the bottommost end of the middle section has a diameter equal to that of the bottommost section and the uppermost end of the middle section has a diameter equal to that of the uppermost section.

Depending from the buoy 102 is a turbine inlet pipe 106 within a lower portion of which is positioned a water turbine (not visible). The turbine inlet pipe is joined to an effluent buffer chamber 107, by means of an effluent-buffer junction 114. A lower mouth (not visible) of the turbine inlet pipe, wherein the water turbine is positioned, fluidly connects the turbine inlet pipe to an interior of the effluent buffer chamber, and water effluent flowing out of the water turbine flows into an interior of the effluent buffer chamber.

Water flows from a water reservoir (not visible) within the buoy into and through the turbine inlet pipe and therethrough to and through the water turbine (not visible). The effluent from the water turbine flows into the effluent buffer chamber 107. Water (not visible) within the effluent buffer chamber then flows into the body of water 101 on which the embodiment 100 floats, through an effluent buffer chamber drain 108. The (transverse) cross-sectional area of the effluent buffer chamber drain is significantly less than the (horizontal) cross-sectional area of the effluent buffer chamber.

When it contains a sufficient volume of water, water from the embodiment's water reservoir (not visible) inside the buoy 102 flows into a reservoir-stabilizing-trompe air ingestion pipe 109. As relatively highly pressurized water from the water reservoir flows into and through the air ingestion pipe, it flows to and through a constricted and/or Venturi section 110 of that air ingestion pipe, thereby tending to create a region of low pressure within the water stream flowing therethrough. At the narrowest point in the Venturi section, i.e., at the Venturi throat, or aspirator/ejector, where the pressure of the water stream flowing through the air ingestion pipe is reduced and/or minimal, the air ingestion pipe is fluidly connected to an air supply pipe 111 at a water-air mixture junction (not visible). And, as water flows through the Venturi section of the air ingestion pipe, air is drawn from the atmosphere into and through an upper mouth 112, and/or aperture, of the air supply pipe, and therethrough into and through the air supply pipe. Air within the air supply pipe is drawn into the Venturi section of the air ingestion pipe at and/or through the water-air mixture junction where it mixes and/or combines with the water flowing therethrough.

The air/water mixture that flows down through the air ingestion pipe 109, and away from the water-air mixture junction, then flows through and out of a lower mouth (not visible) of the air ingestion pipe at lower end of the air ingestion pipe (adjacent to the junction 113 of the air ingestion pipe and the effluent buffer chamber 107) and therethrough into an interior of the effluent buffer chamber to which it is fluidly connected. The air bubbles flowing out of the air ingestion pipe, and into the interior of the effluent buffer chamber, tend to rise within the water inside the effluent buffer chamber and join the air within the air pocket (not visible) within an interior of the buoy 102, thereby tending to increase the amount and pressure of air within that air pocket.

When the level of free surface of the water within the embodiment's water reservoir (not visible) is below a target and/or threshold level, then water from the water reservoir stops flowing into the air ingestion pipe and the water within the air ingestion pipe flows down to a level below that of the water-air mixture junction (not visible). The consequent absence of water within the upper portion of the air ingestion pipe then allows air from the embodiment's air pocket to flow out of the embodiment and into the atmosphere through the air supply pipe 111, and through the upper mouth 112 thereof.

Figure 2:
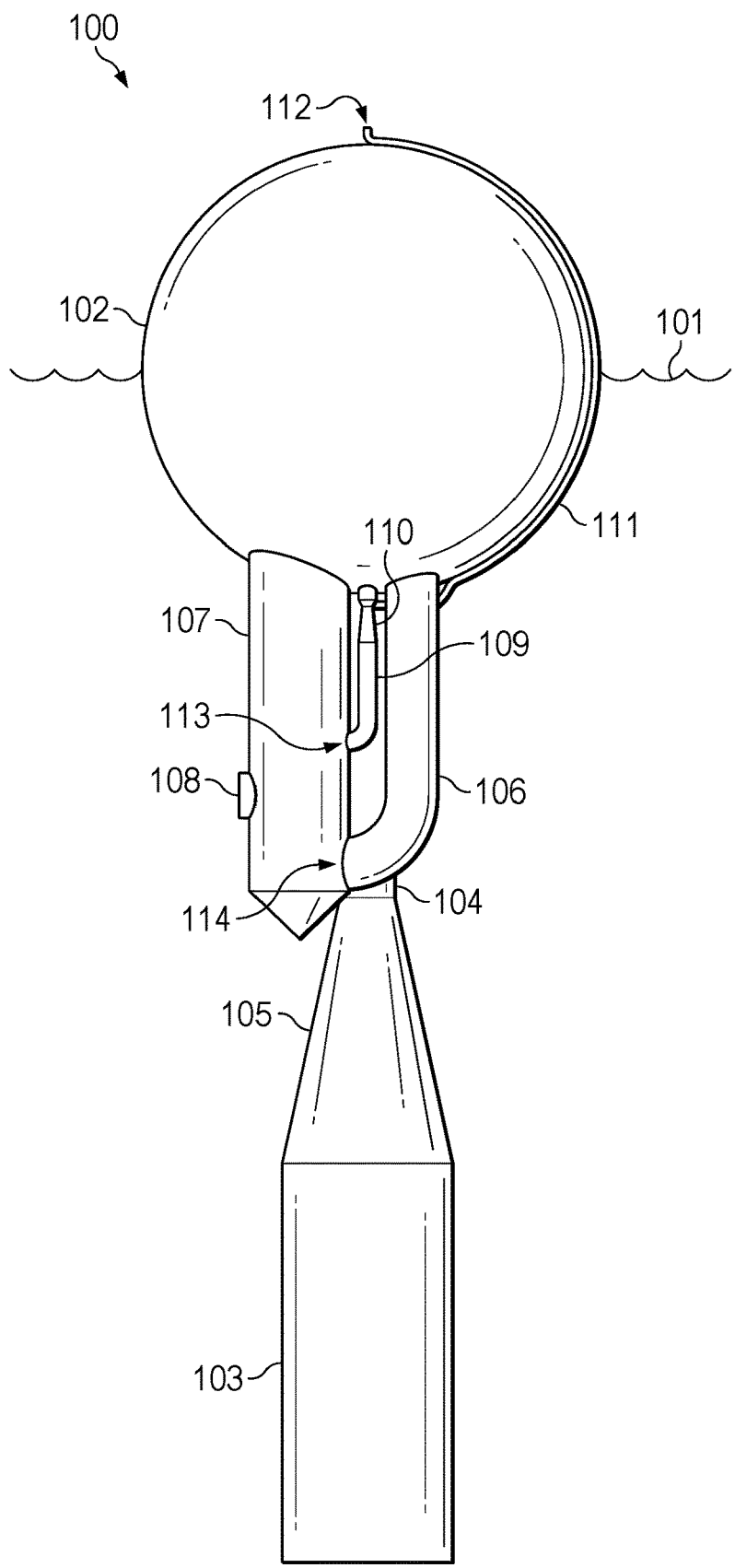
FIG. 2 is a side view of the first embodiment of the present invention.

FIG. 2 illustrates a side view of the same embodiment 100 of the current disclosure that is illustrated in FIG. 1.

Figure 3:
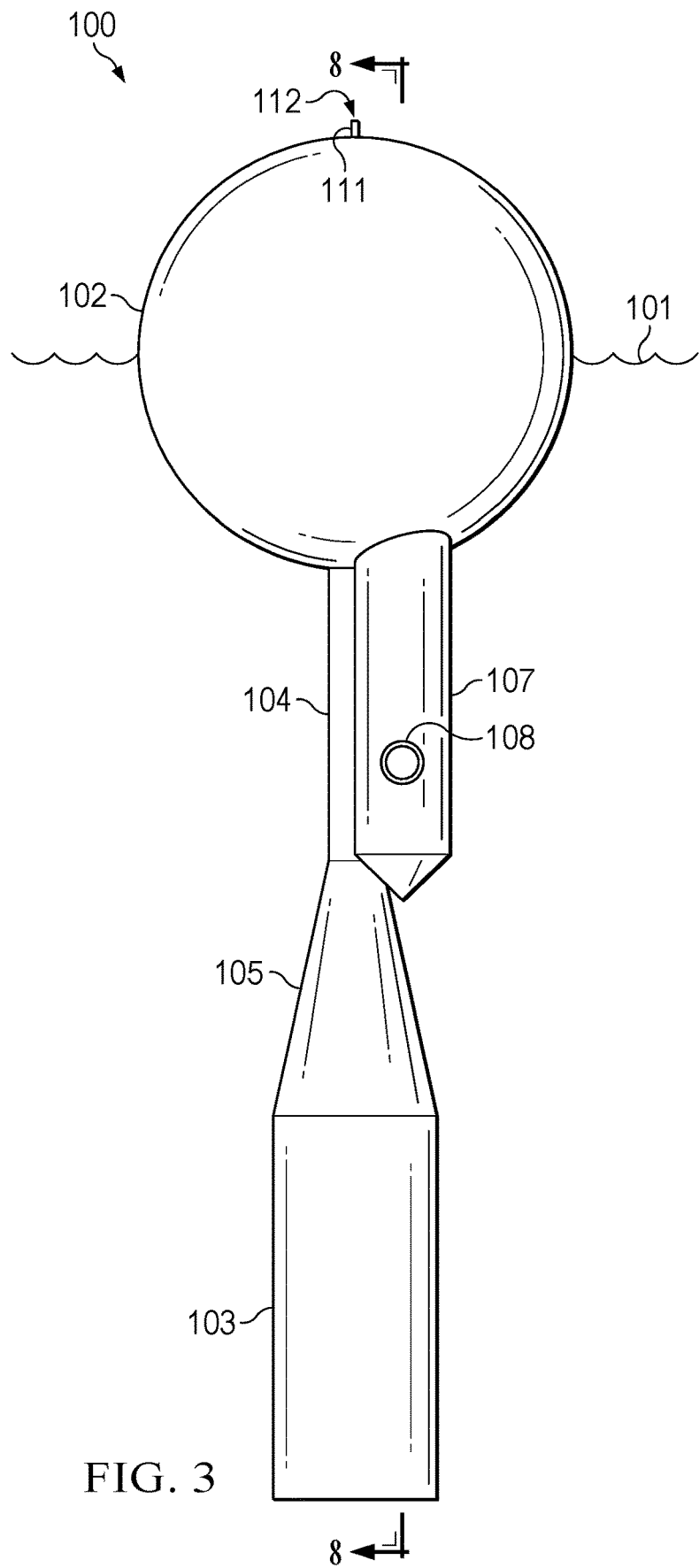
FIG. 3 is a side view of the first embodiment of the present invention.

FIG. 3 illustrates a side view of the same embodiment 100 of the current disclosure that is illustrated in FIGS. 1 and 2.

Figure 4:
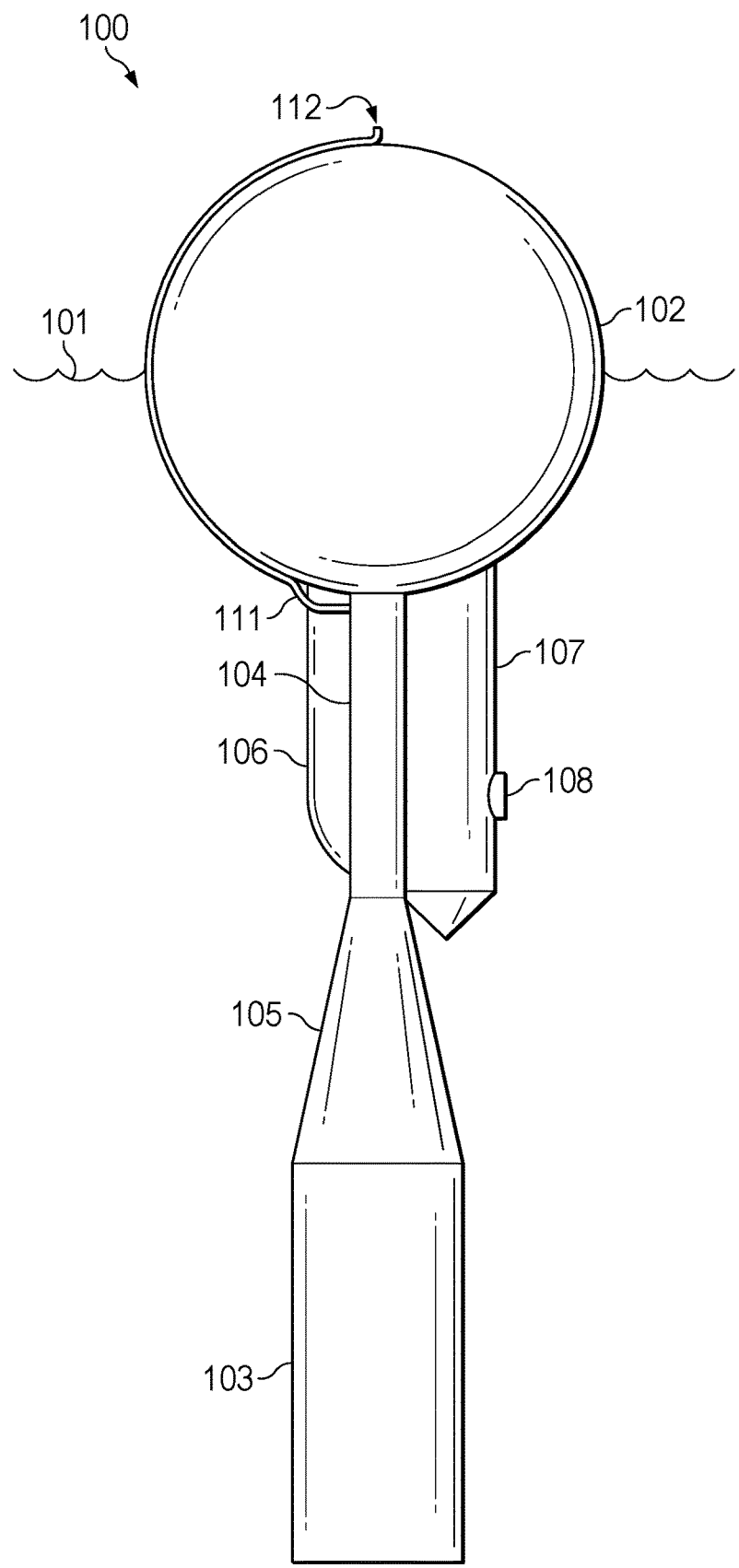
FIG. 4 is a side view of the first embodiment of the present invention.

FIG. 4 illustrates a side view of the same embodiment 100 of the current disclosure that is illustrated in FIGS. 1-3.

Figure 5:
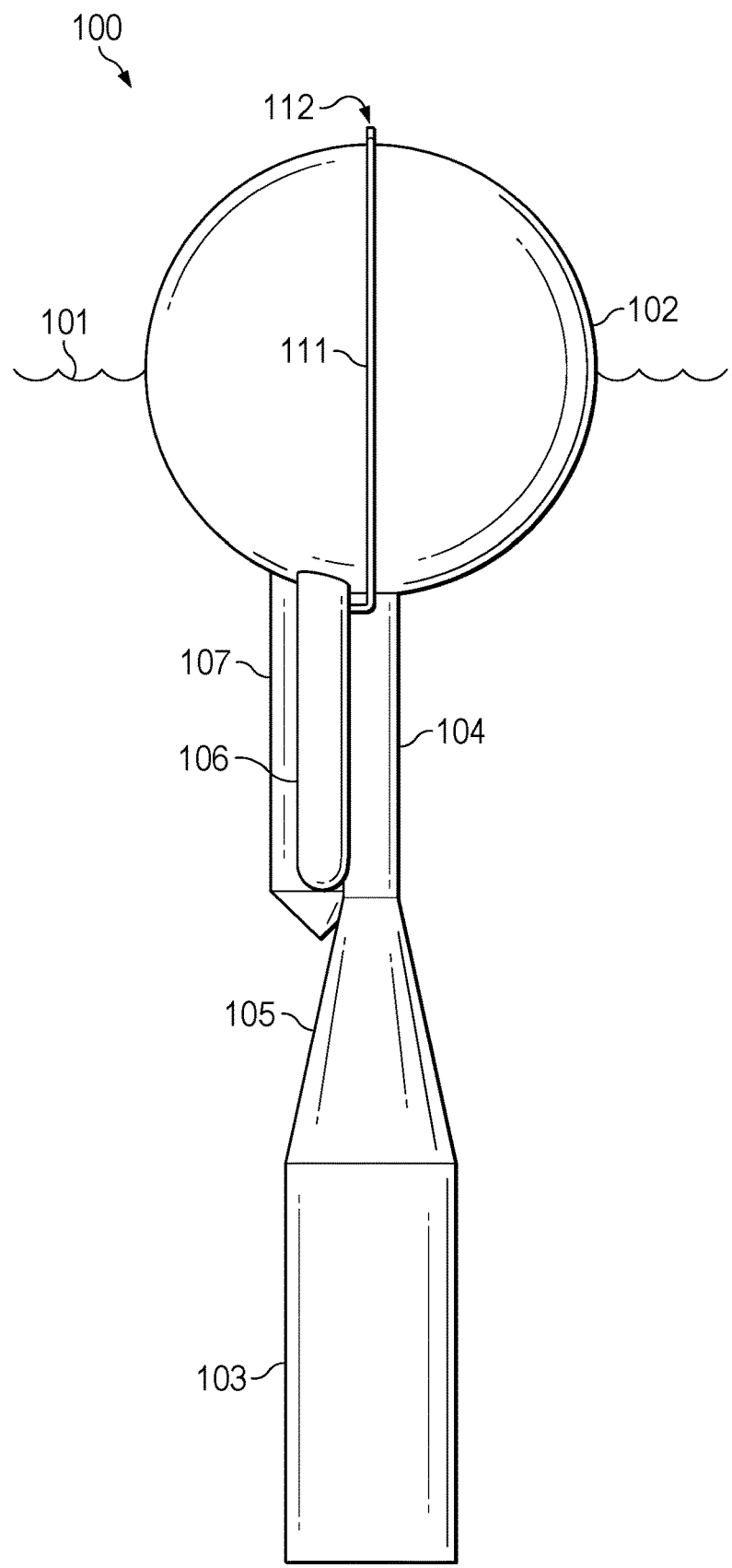
FIG. 5 is a side view of the first embodiment of the present invention.

FIG. 5 illustrates a side view of the same embodiment 100 of the current disclosure that is illustrated in FIGS. 1-4.

Figure 6:
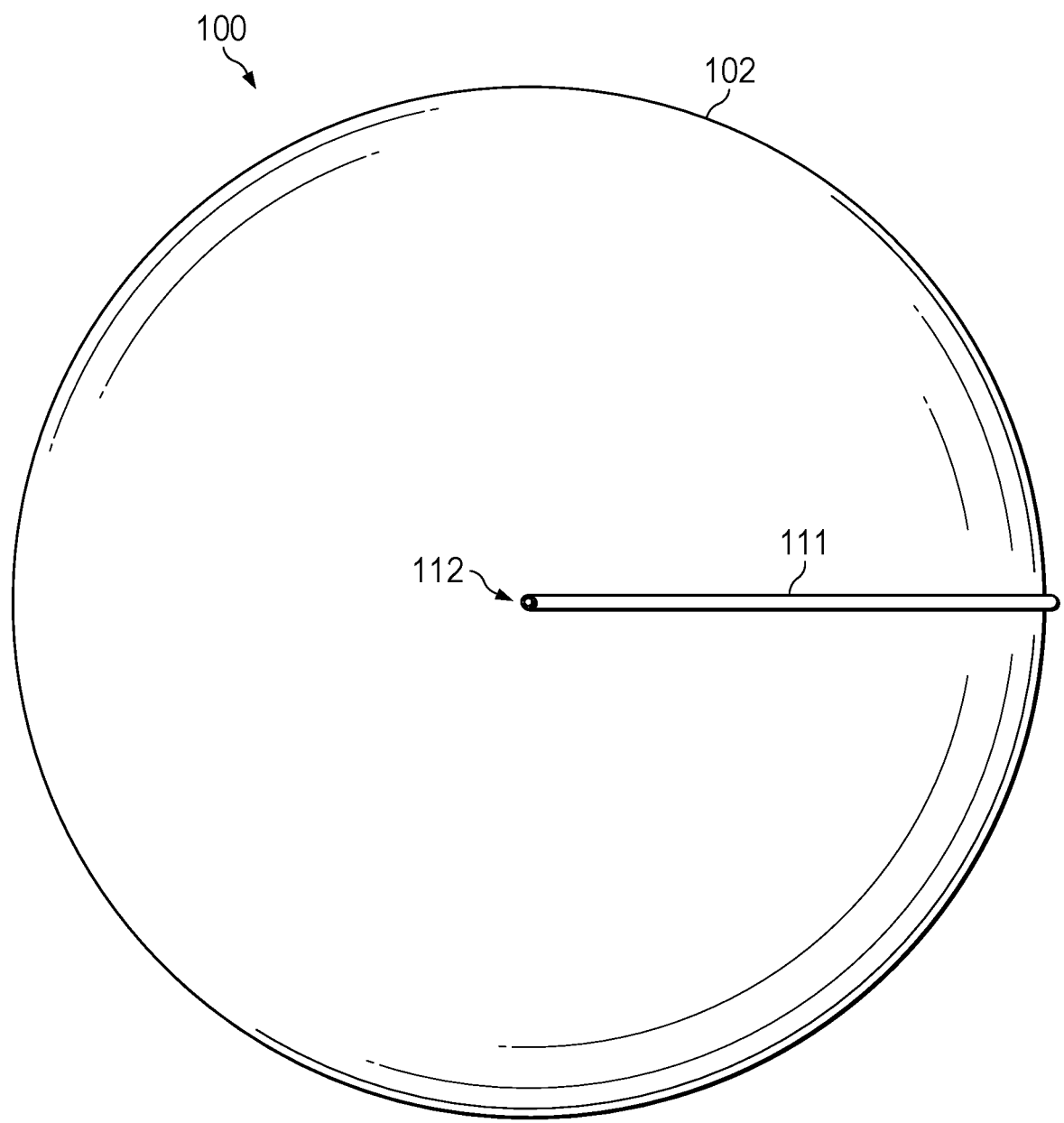
FIG. 6 is a top-down view of the first embodiment of the present invention.

FIG. 6 illustrates a top-down view of the same embodiment 100 of the current disclosure that is illustrated in FIGS. 1-5.

Figure 7:
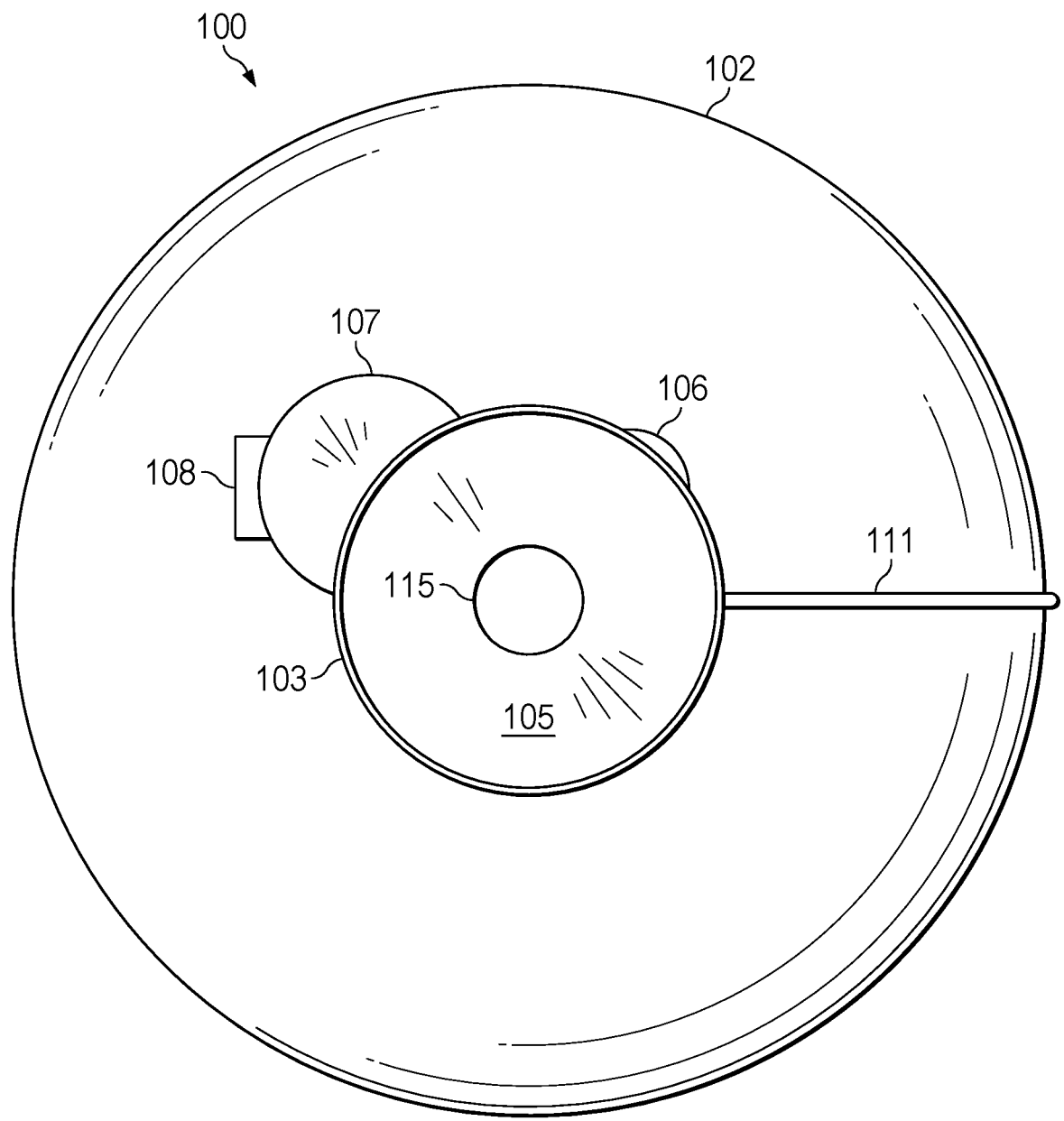
FIG. 7 is a bottom-up view of the first embodiment of the present invention.

FIG. 7 illustrates a bottom-up view of the same embodiment 100 of the current disclosure that is illustrated in FIGS. 1-6. Visible inside injection tube 103 is an upper mouth 115 of that injection tube through which water is periodically ejected from an interior of the injection tube and into an interior of buoy 102, thereafter being deposited into the embodiment's water reservoir (not visible).

Figure 8:
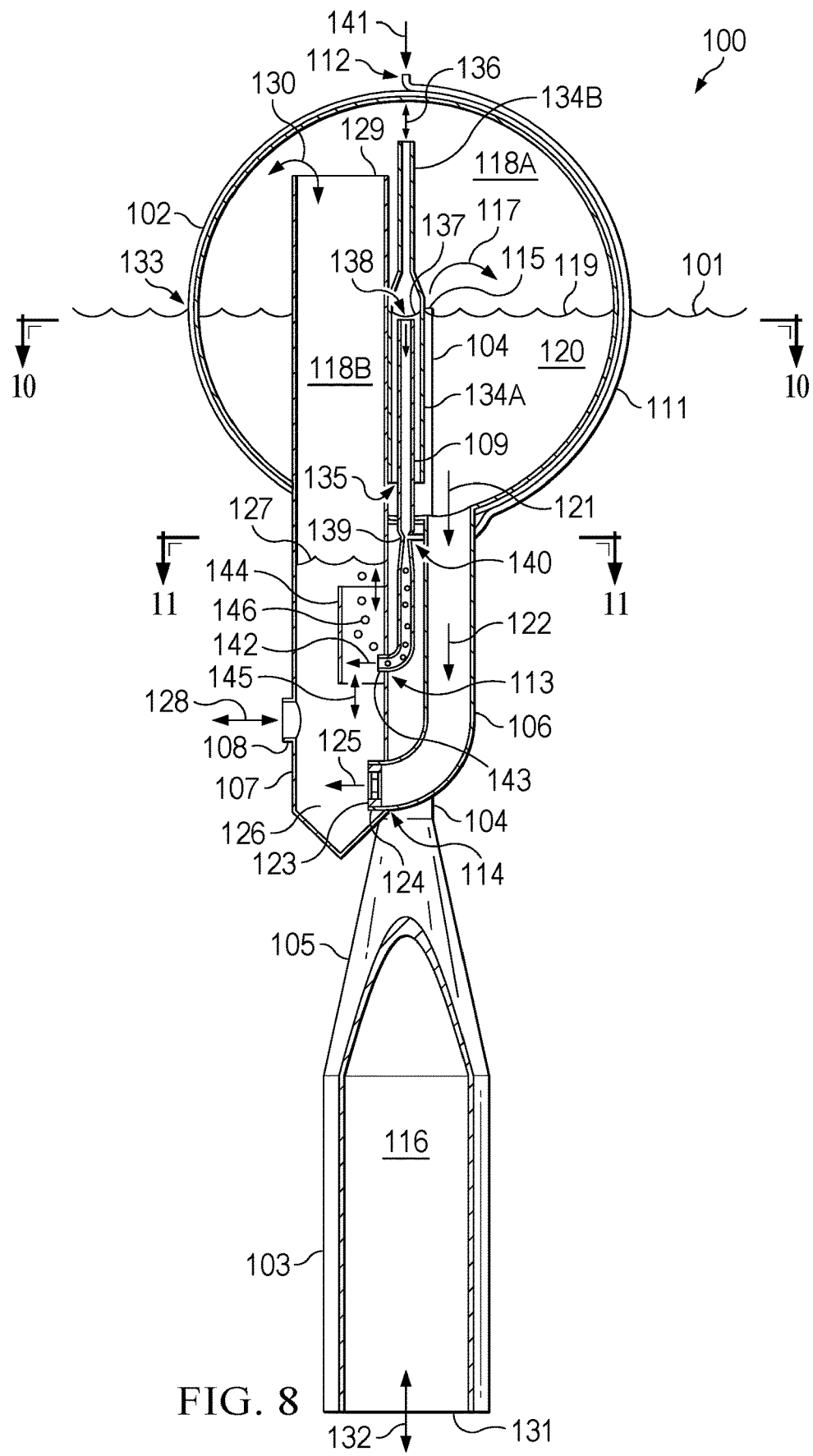
FIG. 8 is a side sectional view of the first embodiment of the present invention.

FIG. 8 illustrates a side sectional view of the same embodiment 100 of the current disclosure that is illustrated in FIGS. 1-7, where the section is taken along the section line 8-8 specified in FIG. 3.

As the hydrodynamic pump embodiment 100 moves up and down in response to a passage of waves across the upper surface 101 of the body of water on which it floats, the inertia of the water 116 inside the pump's injection tube 103-105 causes that water to not move, and/or to resist moving, in synchrony with the vertical movements of the hydrodynamic pump 100.

When the hydrodynamic pump descends from a passing wave crest, the constricted portion 105 of its injection tube 103-105 tends to push the water 116 within the tube downward. When the pump subsequently ascends on an approaching wave crest, the downward momentum of the water 116 within the pump's injection tube causes that water 116 within the injection tube to continue moving downward, even as the hydrodynamic pump begins moving upward due to its buoyancy and the wave's rising water surface. However, depth (head) pressure of the water outside a lower mouth 131 of the injection tube slows the water's descent and reverses it, sending and/or accelerating the water upward. The up and down movements of the water 116 within the embodiment's injection tube 103-105 in response to ambient wave motion tends to result in, and/or cause, water to regularly flow 132 in and out of the lower mouth of the injection tube.

By the time the hydrodynamic pump is again descending from a passing wave crest, and toward an approaching wave trough, it will periodically be the case that the water 116 within its injection tube 103-105 is ascending (e.g., having rebounded from an earlier push downward). During such moments of contrary motion, the water moving upward within the injection tube will tend to collide with the constricted portion 105 of that tube thereby tending to partially arrest the upward ascent of the upwardly flowing water, and also tending to amplify the pressure and upward acceleration of a portion of that rising water, thereby tending to cause portions of such upwardly accelerated water to be ejected 117 from an upper mouth 115 of the pump's injection tube and therefrom into an air pocket 118A positioned within an upper portion of an interior of the hollow buoy 102. The ejected water tends to fall onto, into, and/or through, an upper surface 119 of a water reservoir 120 positioned within a lower portion of the interior of the hollow buoy, adding its volume to that of the water already there and thereby increasing, and/or raising, a level and/or height of that upper surface.

The embodiment's air pocket 118A is typically pressurized to a pressure greater than atmospheric, i.e., greater than 100 kilopascals (kPa), e.g., 120-200 kPa.

Water from the water reservoir 120 flows 121 into an upper mouth or aperture of the turbine inlet pipe 106. It then flows 122 through the turbine inlet pipe to the embodiment's water turbine 123 which is positioned at, adjacent to, and/or within, a lower mouth 124 of the turbine inlet pipe. Water from the turbine inlet pipe flows into and through the water turbine, and then the water effluent flows 125 out of the water turbine and into an interior of the effluent buffer chamber 107.

The effluent of the water turbine 123 flows into an interior of the embodiment's effluent buffer chamber 107 where it joins, and/or is added to, the water 126 accumulated within that effluent buffer chamber. An upper free surface 127 of the water within the effluent buffer chamber is positioned at a distance below the upper surface 101 of the body of water on which the embodiment floats. The upper free surface of the water within the effluent buffer chamber is positioned at a depth whereat the pressure of the air within the embodiment's air pocket 118 is equal to the depth-related head pressure of the water outside the embodiment at the same level as that upper free surface. Thus, when effluent flows 125 out of the water turbine and into the effluent buffer chamber, water likewise and/or also tends to flow 128 out of the effluent buffer chamber drain 108 of the effluent buffer chamber at approximately the same rate, i.e., thereby tending to preserve and/or maintain the position, and/or equivalent depth, of the upper free surface of the water within the effluent buffer chamber.

An upper mouth 129 of the effluent buffer chamber 107 fluidly connects 130 the interior 118B of the effluent buffer chamber to the air pocket 118A above the embodiment's water reservoir 120. Thus, the pressure of the pocket of air 118B within the effluent buffer chamber tends to always, constantly, and/or consistently, equal, and/or approximately equal, the pressure of the pocket of air 118A above the water reservoir.

As the embodiment 100 moves up and down in response to passing waves, the water 116 within its injection tube 103-105 moves up and down relative to the tube. The movement of the water within the injection tube tends to significantly alter the volume which the air within the air pocket 118 may fill and/or occupy. Because of the changing volume of the air pocket 118, the pressure of that air tends to increase and decrease across a significant range, e.g., a nominal pressure of 150 kPa may fluctuate between 120 and 180 kPa.

Fluctuations in the pressure of the air pocket of a hydrodynamic pump tend to directly alter the inlet pressure of the water turbine. And, in a hydrodynamic pump of the prior art, such fluctuations in the pressure of the air pocket also tend to directly alter the net pressure of the pump's water turbine, thereby tending to stress the blades and bearings of the pump's water turbine, as well as the water turbine's respective operatively connected generator, power electronics, and electrical load.

Because the hydrodynamic pump 100 of the present disclosure includes an effluent buffer chamber 107, the inlet and net pressures of the pump's water turbine 123 are not adversely, if at all, affected and/or impacted by fluctuations in the pressure of the pump's air pocket 118. When the pressure of the air (or other gas) within the air pocket 118A above the pump's water reservoir 120 changes, so too does the pressure of the fluidly connected air pocket 118B above the water within the pump's effluent buffer chamber, thus, and/or thereby, tending to cancel the effects of the pressure change(s) with respect to the net pressure of the water turbine.

The total pressure of the water at the inlet side of the water turbine 123 is, at least in part, the sum of the head pressure of the water between the water turbine and the surface 119 of the water reservoir 120, and the pressure of the air pocket 118A above the water reservoir. Therefore, when the pressure of the air pocket 118A of the hydrodynamic pump embodiment 100 changes, so too does the total pressure of the water flowing into the water turbine, i.e., so too does the inlet pressure. However, the total pressure of the water at the effluent side of the water turbine is, at least in part, the sum of the head pressure of the water between the water turbine and the surface 127 of the water 126 inside the effluent buffer chamber 107, and the pressure of the air pocket 118B above that water 126 inside the effluent buffer chamber. And, since the air pocket 118A above the water reservoir is fluidly connected to the air pocket 118B above the effluent-buffer-tube water, the pressures of those two air pockets are always equal. Therefore, any change to the inlet pressure of the water turbine caused by a change in the pressure of the air pocket 118A above the water reservoir 120, will, at least to an approximate degree, be cancelled by an equal and immediate change to the back pressure of the water turbine caused by an equal and immediate change in the pressure of the air pocket 118B above the effluent-buffer-tube water 126. In other words, any increase or decrease in the inlet pressure of the water turbine caused by an increase or decrease in the pressure of the air pocket 118A will be offset by an increase or decrease of equal magnitude in the back pressure of the water turbine caused by an increase or decrease in the pressure of the air pocket 118B.

Thus, the effluent buffer chamber 107 of the present disclosure removes a common, and/or frequent, costly and inefficient fluctuation in the net pressure to which a respective water turbine 123 is exposed, and/or subjected, and the stress of which may shorten the operational lifetime of a respective water turbine, and its operatively connected electronics.

Fluctuations in the net pressure of a water turbine of a hydrodynamic pump of the prior art can also be caused by less impulsive, but equally disruptive, changes in the back pressure of the water turbine that results from changes in the depth, draft, and/or waterline of the hydrodynamic pump and the effluent port of the water turbine, i.e., caused by the embodiment's bobbing relative to the free surface of the body of water on which it floats.

The back pressure opposing and/or resisting any outflow of effluent from the water turbine 123 of a hydrodynamic pump of the present disclosure is a sum of the head pressure associated with, and/or caused by, the depth of the water turbine relative to the upper surface 127 of the water 126 within the effluent buffer chamber 107, and the pressure of the air 118B above that water 126. With respect to a hydrodynamic pump of the present disclosure, the back pressure opposing and/or resisting any outflow 125 of effluent from the water turbine is not an immediate consequence, at least not in the short term, of the head pressure associated with, and/or caused by, the depth of the effluent-buffer-tube drain 108 relative to the upper surface 101 of the body of water on which the embodiment floats. Said effluent-buffer-tube drain 108 effectively insulates, and/or isolates, at least partially and for a short time, the water turbine 123 from pressure-changes associated with varying levels of submergence of the hydrodynamic pump.

As the hydrodynamic pump 100 of the present disclosure moves up and down in response to the passage of waves across the surface 101 of the body of water on which it floats, it tends to alternately and repeatedly "pop out" of the water and to, at least partially, submerge. Such popping out of the water, and being partially submerged within the water is referred to as "bobbing" and this tends to be a characteristic of hydrodynamic pumps of both the prior art and the present disclosure.

As the waterline 133 of the embodiment 100 fluctuates above and below its resting, nominal, average, and/or typical position on the embodiment, so too the depth of the effluent buffer chamber drain 108 of the effluent buffer chamber 107 increases and decreases, respectively. Because of this, the hydrostatic (head and/or depth) pressure of the water outside the embodiment, and outside the effluent buffer chamber drain, which opposes and resists the outflow 128 of water from the effluent buffer chamber drain, increases and decreases, respectively.

When the distance of the effluent buffer chamber drain 108 to the embodiment's waterline 133 increases, so too does the height of the water between the effluent buffer chamber drain and the surface 101 of the body of water on which the embodiment floats. The resulting increase in the height of the water between the effluent buffer chamber drain and the surface 101 increases the head pressure opposing and/or resisting any outflow 128 from the interior 126 of the effluent buffer chamber 107 to the body of water.

When the embodiment's waterline rises, and the hydrostatic and/or head pressure of the water outside the effluent buffer chamber drain 108 increases, then water 101 will tend to flow 128 into the effluent buffer chamber 107 through its effluent buffer chamber drain, thereby tending to raise and/or elevate the upper surface 127 of the water 126 within the effluent buffer chamber. However, because the cross-sectional area of the effluent buffer chamber drain is substantially less than the cross-sectional area of the effluent buffer chamber, the rate at which the upper surface of the water within the effluent buffer chamber rises tends to be relatively slow, e.g., taking many seconds to reach a new greater equilibrium height and/or elevation. And the greater the ratio of the cross-sectional area of the effluent buffer chamber to the cross-sectional area of the effluent buffer chamber drain, the slower the rate at which the upper surface of the water within the effluent buffer chamber will rise in response to an increase in the hydrostatic pressure outside the effluent buffer chamber drain.

As the elevation of the upper surface 127 of the water 126 within the effluent buffer chamber 107 rises, so too the back pressure opposing and/or resisting the outflow 125 of effluent from the water turbine 123 increases (all else being equal), which reduces the net pressure across the water turbine, and reduces the power that the water turbine is able to produce.

The relatively slow increase in the height of the upper surface 127 of the water 126 within the effluent buffer chamber 107 in response to an increase in the hydrostatic pressure outside the effluent buffer chamber drain, and the associated relatively slow resulting increase in the back pressure of the water turbine 123, is preferable to the relatively sudden, if not instantaneous, increase in the back pressure associated with an increase in the depth of an unbuffered effluent port of a hydrodynamic pump of the prior art.

The relatively slow increase in the back pressure associated with the buffering provided by the effluent buffer chamber 107 of a hydrodynamic pump of the present disclosure tends to be less stressful on a water turbine, its blades, its bearings, and its respective operatively connected generator, power electronics, and electrical load. Furthermore, because typical ocean waves are characterized by periods of 10-15 seconds, a slow increase in the back pressure of a water turbine in a hydrodynamic pump of the present disclosure that results from a rising of the waterline, and/or an increase in the depth, of a hydrodynamic pump of the present disclosure will likely not have time to progress very far before the waterline again begins to fall, and the depth again begins to decrease, which will tend to stop and reverse any slight increase in the back pressure of the water turbine that may have occurred before the reversal.

When the distance of the effluent buffer chamber drain 108 to the embodiment's waterline 133 decreases, so too does the height of the water between the effluent buffer chamber drain and the surface 101 of the body of water on which the embodiment floats. When the distance of the effluent buffer chamber drain 108 to the embodiment's waterline 133 decreases, so too does the head pressure opposing and/or resisting any outflow 128 from the interior 126 of the effluent buffer chamber 107 to the body of water.

When the embodiment's waterline falls, and the hydrostatic and/or head pressure of the water outside the effluent buffer chamber drain 108 decreases, then water 126 will tend to flow 128 from, and/or out of, the effluent buffer chamber 107 through the effluent buffer chamber drain and into the body of water 101 on which the embodiment floats. The outflow of water from the effluent buffer chamber lowers the upper surface 127 of the water 126 within the effluent buffer chamber. However, because the cross-sectional area of the effluent buffer chamber drain is substantially less than the cross-sectional area of the effluent buffer chamber, the rate at which the upper surface of the water within the effluent buffer chamber falls, tends to be relatively slow, e.g., taking many seconds to reach a new lesser equilibrium height and/or elevation. And the greater the ratio of the cross-sectional area of the effluent buffer chamber to the cross-sectional area of the effluent buffer chamber drain, the slower the rate at which the upper surface of the water within the effluent buffer chamber will fall.

As the elevation of the upper surface 127 of the water 126 within the effluent buffer chamber 107 falls, so too the back pressure opposing and/or resisting the outflow 125 of effluent from the water turbine 123 decreases, which increases the net pressure across the water turbine, and increases the power that the water turbine is able to produce.

The relatively slow reduction in the height of the upper surface 127 of the water 126 within the effluent buffer chamber 107, and the associated relatively slow decrease in the back pressure of the water turbine 123, is preferable to the impulsive, if not instantaneous, decrease in the back pressure of the water turbine associated with a decrease in the depth of the effluent port of a hydrodynamic pump of the prior art. The relatively slow decrease in the back pressure of a water turbine associated with the buffering provided by an effluent buffer chamber of a hydrodynamic pump of the present disclosure tends to be less stressful on a water turbine, its blades, its bearings, and its respective operatively connected generator, power electronics, and electrical load. Furthermore, because typical ocean waves are characterized by periods of 10-15 seconds, a slow decrease in the back pressure of a water turbine in a hydrodynamic pump of the present disclosure that results from a falling of the waterline, and/or a decrease in the depth, of a hydrodynamic pump of the present disclosure will likely not have time to progress very far before the waterline again begins to rise, and the depth again begins to increase, which will tend to stop and reverse any slight decrease in the back pressure of the water turbine that may have occurred before the reversal.

When the pressure of a hydrodynamic pump's air pocket increases, the upper surface of the water within its injection tube falls, descends, is pushed, and/or moves lower. When the upper surface of the water within the injection tube of a hydrodynamic pump is relatively lower and/or further from the upper mouth of its injection tube, then the amount of wave energy required to cause an ejection of water from that upper mouth and into its water reservoir, is relatively greater.

Conversely, when the pressure of a hydrodynamic pump's air pocket decreases, the upper surface of the water within its injection tube rises, ascends, and/or moves higher. When the upper surface of the water within the injection tube of a hydrodynamic pump is relatively higher and/or nearer the upper mouth of its injection tube, then the amount of wave energy required to cause an ejection of water from that upper mouth and into pump's water reservoir, is relatively less and/or lower.

If a hydrodynamic pump is to be able to adjust the pressure of its air pocket, then it becomes able to adjust the rate at which water flows into its water reservoir from its injection tube, and it therefore becomes able to adapt to wave climates of different energies.

If a hydrodynamic pump operates in a wave climate of a particular energy level with an air-pocket pressure that is relatively under-pressurized and therefore permits too much water to flow from its injection tube into its water reservoir, then it will lose potential energy as excess and/or surplus water flows from its water reservoir and back into its injection tube and is therethrough and thereby lost.

If a hydrodynamic pump operates in a wave climate of a particular energy level with an air-pocket pressure that is relatively over-pressurized and therefore permits too little water to flow from its injection tube into its water reservoir, then it will lose energy as some of the water which might have otherwise flowed from the injection tube, and provided the means to produce electrical power, is unable to overcome the energetic barrier imposed by the over-pressurized air pocket, and/or loses significant energy as it falls a large distance from the spout of the injection tube to the much lower reservoir water free surface.

Hydrodynamic pumps of the prior art lack the ability to passively control the level of water within their respective water reservoirs. Therefore, if they are to be able to adapt to wave climates of changing energy levels, then these hydrodynamic pumps of the prior art must either incorporate mechanical air compressors, which can fail and thereafter become difficult to repair or replace when a respective hydrodynamic pump is floating in an ocean many miles from shore, or they must operate with a single, unchanging, and/or approximately constant, baseline, nominal, resting, and/or average air-pocket pressure and therefore suffer inefficiencies at all but one, or few, of the wave climates that it is likely to encounter.

A hydrodynamic pump of the prior disclosure, which lacks a mechanical air compressor, can operate efficiently at only a particular rate of water inflow from its injection tube. And, when waves are relatively energetic, and such a hydrodynamic pump of the prior disclosure is adding water to its water reservoir faster than water is flowing out of its water reservoir through its water turbine, then excess and/or surplus water will accumulate and will tend to flow back into the upper mouth of its injection tube and back to the body of water on which the hydrodynamic pump floats. Such water back flow, and the potential energy contained therein, will be lost the hydrodynamic pump thereby representing a potentially significant power and cost inefficiency. Conversely, when waves are relatively weak, and such a hydrodynamic pump of the prior disclosure is failing to add water to its water reservoir as quickly as water is flowing out of that water reservoir through its water turbine, then the water reservoir will become increasingly diminished, causing inefficiencies as previously described.

The resting, nominal, typical, and/or average position and/or height of the upper surface (not visible) of the water 116 within the injection tube 103-105 of the hydrodynamic pump of the present disclosure illustrated in FIG. 8 will tend to be the same as the upper surface 127 of the water 126 within the effluent buffer chamber 107, they are both pushed downward until they reach a depth where the pressure of the air pocket pushing them downward from above is equal to the hydrostatic pressure of the body of water 101 pushing them upward from below. When the pressure of the embodiment's air pocket 118 increases, the resting upper surfaces of the water in both the effluent buffer chamber and the injection tube fall, descend, and/or move lower, by approximately the same amount. Likewise, when the pressure of the embodiment's air pocket 118 decreases, the upper surfaces of the water in both the effluent buffer chamber and the injection tube rise, ascend, and/or move higher, by approximately the same amount.

When the upper (free) surface of the water within the injection tube 103-105 of the embodiment 100 is relatively higher and/or nearer the upper mouth 115 of the injection tube, then the amount of wave energy required to cause an ejection 117 of water from that upper mouth and into the water reservoir 120, is relatively less and/or lower, and the frequency with which such ejections of water will occur tends to be relatively higher. Conversely, when the upper (free) surface of the water within the injection tube of the embodiment is relatively lower and/or further from the upper mouth of the injection tube, then the amount of wave energy required to cause an ejection of water from that upper mouth and into the water reservoir 120, is relatively greater, and the frequency with which such ejections of water will occur tends to be relatively lower.

The optimal frequency at which water is ejected from the injection tube of a hydrodynamic pump, and/or the optimal rate at which the injection tube of a hydrodynamic pump adds water to the pump's water reservoir, is that frequency of ejections, and/or that rate of water addition, which adds water to the water reservoir at the same rate at which water from that water reservoir flows through the pump's water turbine and therethrough back to the body of water 101 on which the hydrodynamic pump floats.

The hydrodynamic pump of the present disclosure adjusts the pressure of its air pocket 118 so as to control the rate at which water is ejected from the upper mouth 115 of the pump's injection tube 103-105 in order to approximately match the rate at which water flows 117 into the water reservoir from the injection tube with the rate at which water 120 flows 121 into and 125 out of the water turbine 123. In other words, the hydrodynamic pump of the present disclosure adjusts the pressure of its air pocket 118 so as to maintain an approximately constant level and/or amount of water within its water reservoir 120.

Water from the embodiment's water reservoir 120 is able to flow into the embodiment's air ingestion pipe shroud 134A through an annular gap 135 at a lower end of the shroud that fluidly connects an interior of the air ingestion pipe shroud to the water reservoir. Air is able to flow 136 in and out of the air ingestion pipe shroud 134B through an aperture at an upper end of the shroud. Therefore, the level 137 of water within the air ingestion pipe shroud tends to be at the same average level as the water within the embodiment's water reservoir 120.

The position, height, and/or elevation of an upper mouth 138 of the air ingestion pipe establishes a target level of the respective water reservoir 120, and/or a target height, and/or elevation of the upper surface 119 of the water within the embodiment's water reservoir. The air ingestion pipe shroud 134 covers and surrounds the upper end, and the upper mouth, of the embodiment's reservoir-stabilizing trompe air ingestion pipe 109 and stabilizes the level 137 of water adjacent to the upper mouth of the air ingestion pipe. Sloshing, and other perturbations of the surface 119 of the water reservoir, will tend to interfere with the desired operation of the reservoir-stabilizing trompe by frequently, and inappropriately, raising and lowering the level of water at the upper mouth 138 of the air ingestion pipe. The air ingestion pipe shroud insulates the level of the water adjacent to the upper mouth of the air ingestion pipe from motion-related disturbances of the upper surface of the water reservoir.

In the configuration illustrated in FIG. 8, the upper level 119 of water within the embodiment's water reservoir 120, as well as the level 137 of water within the embodiment's air ingestion pipe shroud 134, are above the upper mouth 138 of the air ingestion pipe 109, and therefore above the target level, height, and/or elevation of the upper surface 119 of the water within the embodiment's water reservoir. In this condition and/or configuration, water 137 within the air ingestion pipe shroud flows into the upper mouth of the air ingestion pipe, and thereafter downward through and/or within the air ingestion pipe.

As water flows downward through the embodiment's air ingestion pipe 109 it reaches and flows into a constricted, and/or Venturi, portion (110 of FIG. 2) of that air ingestion pipe. At the narrowest point 139, and/or throat, in the constricted, and/or Venturi, and/or aspirator/ejector, portion of that air ingestion pipe, that air ingestion pipe fluidly connects with the embodiment's air supply pipe 111 at a water-air mixture junction 140. As water flows through the constricted portion of the air ingestion pipe, the water tends to flow more quickly than it does in other portions of the pipe, and the static pressure of the water flowing through the constricted portion of the air ingestion pipe tends to drop, thereby tending to create a partial vacuum within the stream of water flowing through that constricted portion of the air ingestion pipe. The partial vacuum created by the constriction within the air ingestion pipe tends to draw air from the air supply pipe into the water flowing downward through the air ingestion pipe, thereby tending to entrain bubbles of air within that downward flowing stream of water. Air drawn from the air supply pipe causes atmospheric air to be drawn, and/or to flow 141, into an upper mouth 112, and/or aperture, positioned at an upper end of the air supply pipe.

The stream of water and entrained air bubbles flowing downward through the embodiment's reservoir-stabilizing trompe air ingestion pipe 109 eventually flows 142 through a lower mouth 143 of the air ingestion pipe, and therethrough into a pool of water 126 within the effluent buffer chamber 107. The water and entrained air bubbles flowing 142 out of the air ingestion pipe and into the effluent buffer chamber, initially flows into, and is initially surrounded by, a cylindrical separation gallery 144. Water 126 within the effluent buffer chamber is able to flow, e.g., 145, in and out of the cylindrical separation gallery through the separation gallery's open top and open bottom. Within the cylindrical separation gallery, air bubbles that flow 142 out of the lower mouth 143 of the air ingestion pipe, are able to coalesce into larger bubbles, e.g., 146, as they buoyantly rise towards and through the open top of the cylindrical separation gallery. The bubbles of air deposited, and/or transported, into the water 126 of the effluent buffer chamber rise to and/or toward the upper surface 127 of that water, and then flow into, and join, the air within the embodiment's air pocket 118B— thereby increasing the pressure of the air pocket 118.

The increase in the pressure of the embodiment's air pocket 118 pushes down the resting, nominal, and/or average level of the upper surface of the water within the embodiment's injection tube 103-105, thereby tending to reduce the frequency and volume of ejections of water from the upper mouth 115 of that injection tube, and thereby tending to slow the addition of water to the embodiment's water reservoir 120. At the same time, the increase in the pressure of the embodiment's air pocket also increases the potential energy of the water within the embodiment's water reservoir. So, even though the increase in the pressure of the embodiment's air pocket slows the addition of water to the embodiment's water reservoir, it also increases the potential energy of the water within that water reservoir.

The addition of atmospheric air to the air pocket via the air ingestion pipe 109 and the air supply pipe 111, and the resulting gradual, progressive, incremental, and/or continuous, increase in the pressure of that air, will continue until the upper surface 119 of the water reservoir 120, and the corresponding level 137 of the water within the air ingestion pipe shroud 134, fall below the upper mouth 138 of the air ingestion pipe.

An alternate embodiment similar to the embodiment 100 illustrated in FIGS. 1-7 includes a diodic valve within the effluent buffer chamber drain 108 wherein the diodic drain is configured to maximally, if not completely, obstruct and/or to interfere with a flow of water, from the body of water 101 on which the embodiment floats, into the effluent buffer chamber 107; but is configured to minimally, if not at all, obstruct and/or interfere with a flow of water 126 from inside the effluent buffer chamber to and/or into the body of water 101 on which the embodiment floats.

Figure 9:
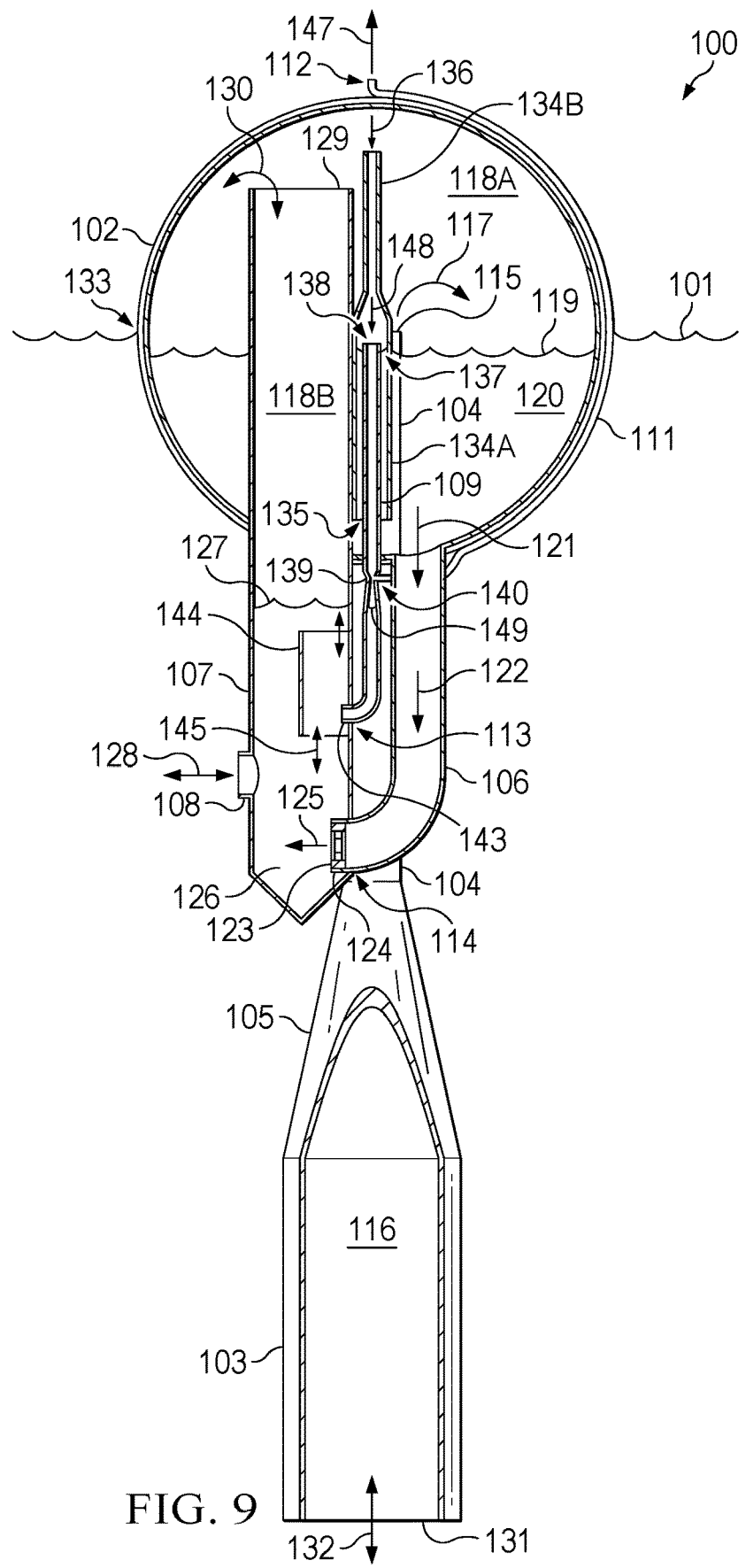
FIG. 9 is a side sectional view of the first embodiment of the present invention.

FIG. 9 illustrates the same side sectional view that is illustrated in FIG. 8, i.e., it illustrates the same embodiment 100 of the current disclosure that is illustrated in FIGS. 1-8, where the section is taken along the section line 8-8 specified in FIG. 3.

The side sectional view illustrated in FIG. 8 illustrates the embodiment 100 when it is configured such that, and/or is in an operational state in which, the level of the upper surface 119 of the water reservoir 120 is above the upper mouth 138 of the reservoir-stabilizing trompe air ingestion pipe 109. As illustrated in FIG. 8, and as explained in the corresponding portion of this disclosure, when the level 119 of the water reservoir 120 is above the upper mouth of the air ingestion pipe, water flows down and through that air ingestion pipe, and thereafter entrains bubbles of air within that flow of water, which it then discharges into the effluent buffer chamber 107, whereupon those bubbles float up to, and join, the embodiment's air pocket 118, thereby raising the pressure of that air pocket, and thereby suppressing and/or decreasing the further inflow of water to the water reservoir from the injection tube 103-105.

By contrast, the side sectional view illustrated in FIG. 9 illustrates the embodiment 100 when it is configured such that, and/or is in an operational state in which, the level of the upper surface 119 of the water reservoir 120 is below the upper mouth 138 of the reservoir-stabilizing trompe air ingestion pipe 109. When the level 119 of the water reservoir 120 is below the upper mouth of the air ingestion pipe, water is unable to flow into the air ingestion pipe, and the level of the water within that air ingestion pipe thereafter and/or therefore falls to a point below the water-air mixture junction 140 thereby allowing air from the embodiment's air pocket 118 to flow through the air-filled upper portion of the air ingestion pipe and therethrough into and through the fluidly-connected air supply pipe 111 whereafter the air escapes 147 the embodiment thereby lowering the pressure of the air within the embodiment's air pocket, and thereby amplifying and/or increasing the inflow of water to the water reservoir from the injection tube 103-105.

When the upper surface 119 of the water reservoir 120, and the manifestation of that upper surface 137 within the air ingestion pipe shroud 134, are below the upper mouth 138 of the air ingestion pipe 109, then the average level of the surface 149 of the water within the air ingestion pipe is pushed down by the pressure of the air pocket 118 to roughly the same average height, level, and/or elevation, as the upper surface 127 of the water 126 within the effluent buffer chamber 107. When, in the nominal case, the levels of the upper surfaces of the water within the effluent buffer chamber and the air ingestion pipe are below the water-air mixture junction 140, then the air pocket 118 of the embodiment is extended down through the air ingestion pipe to a point and/or level below the pipe's junction, joining, and point of fluid connection, with the air supply pipe 111.

This condition and/or configuration stops the flow of water into and through the air ingestion pipe 109, and therethrough into the effluent buffer chamber 107, thereby preventing the inflow of any additional air, and/or air bubbles, to the embodiment's air pocket 118.

Furthermore, this condition and/or configuration allows air from the embodiment's air pocket 118 to flow 136 into the upper end of the air ingestion pipe shroud 134, and therethrough into the upper mouth and/or aperture of the air ingestion pipe shroud 134, and therethrough flow 148 into the upper mouth 138 of the air ingestion pipe, after which the air flows down through the air ingestion pipe and up through the air supply pipe, and therethrough flows 147 through and out of the upper mouth 112 of the air supply pipe, and into the atmosphere above the embodiment.

The outflow of air from the air pocket, and the resulting gradual, progressive, incremental, and/or continuous, reduction of the pressure of that air, will continue until the upper surface 119 of the water reservoir, and the corresponding level 137 of the water within the air ingestion pipe shroud 134, rise above the upper mouth 138 of the air ingestion pipe, or until (on account of decreasing air pressure in the air pocket) the level of water in the air ingestion pipe 109 rises high enough to block air from the air pocket from reaching the air supply pipe.

It is important that in especially poor wave conditions, and/or in the absence of waves, that air will only flow from the embodiment's air pocket 118 to the atmosphere until the pressure of that air pocket reaches a pressure equivalent to the hydrostatic pressure of the water 101 outside the embodiment at the depth of the water-air mixture junction 140. When the pressure of the within the embodiment's air pocket falls to a pressure lower than the hydrostatic pressure of the water 101 outside the embodiment at the depth of the water-air mixture junction, then the level 149 of water within the air ingestion pipe 109 will rise to a height above the water-air mixture junction which will prevent any further escape of air from the air pocket. Thus, in especially poor wave conditions, and/or in the absence of waves, the hydrodynamic pump of the present disclosure will not sink as a result of losing enough air from its air pocket that its buoyancy becomes insufficient to keep the embodiment floating.

Figure 10:
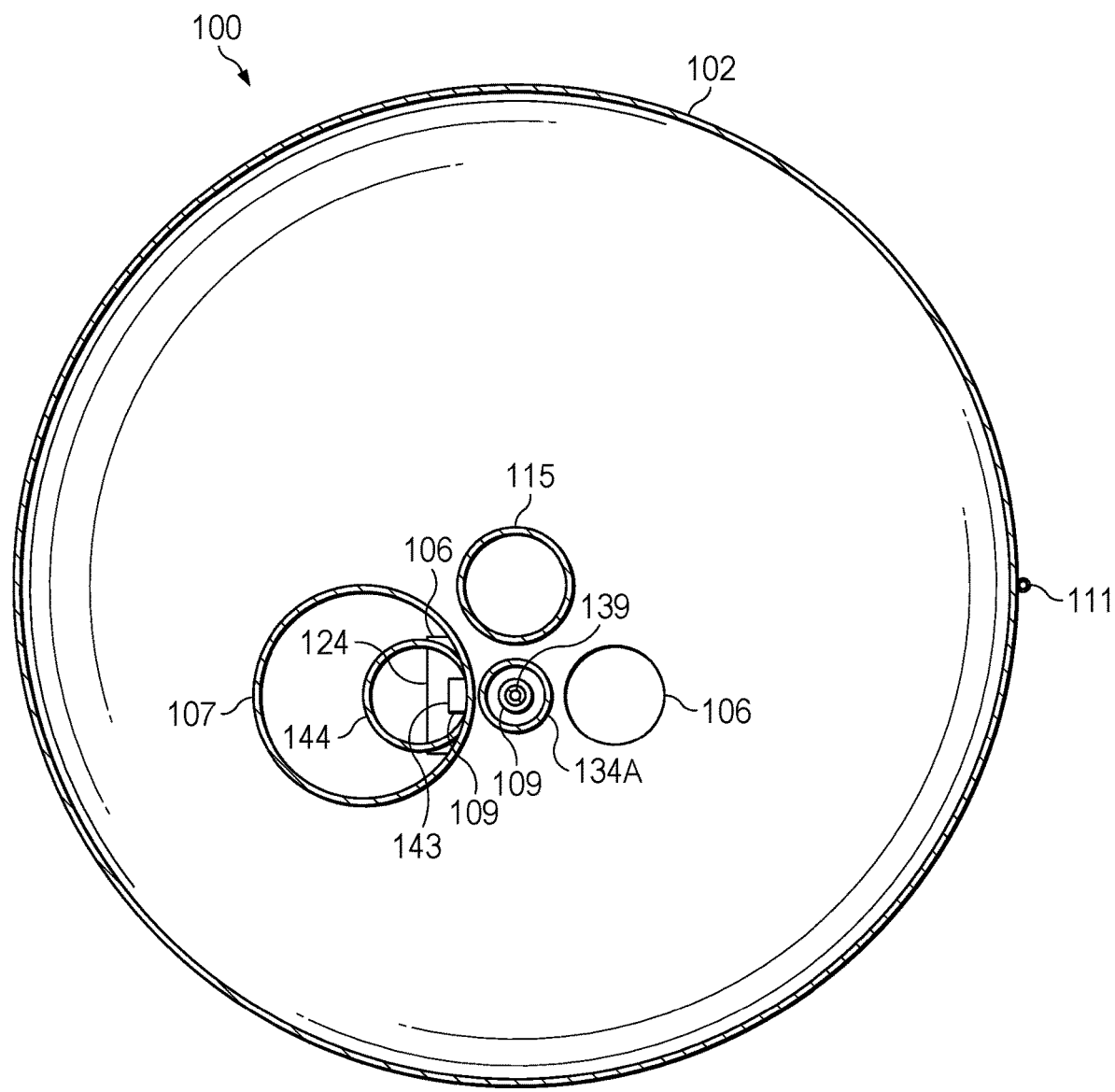
FIG. 10 is a top-down sectional view of the first embodiment of the present invention.

FIG. 10 illustrates a top-down sectional view of the same embodiment 100 of the current disclosure that is illustrated in FIGS. 1-9, where the section is taken along the section line 10-10 specified in FIG. 8.

Figure 11:
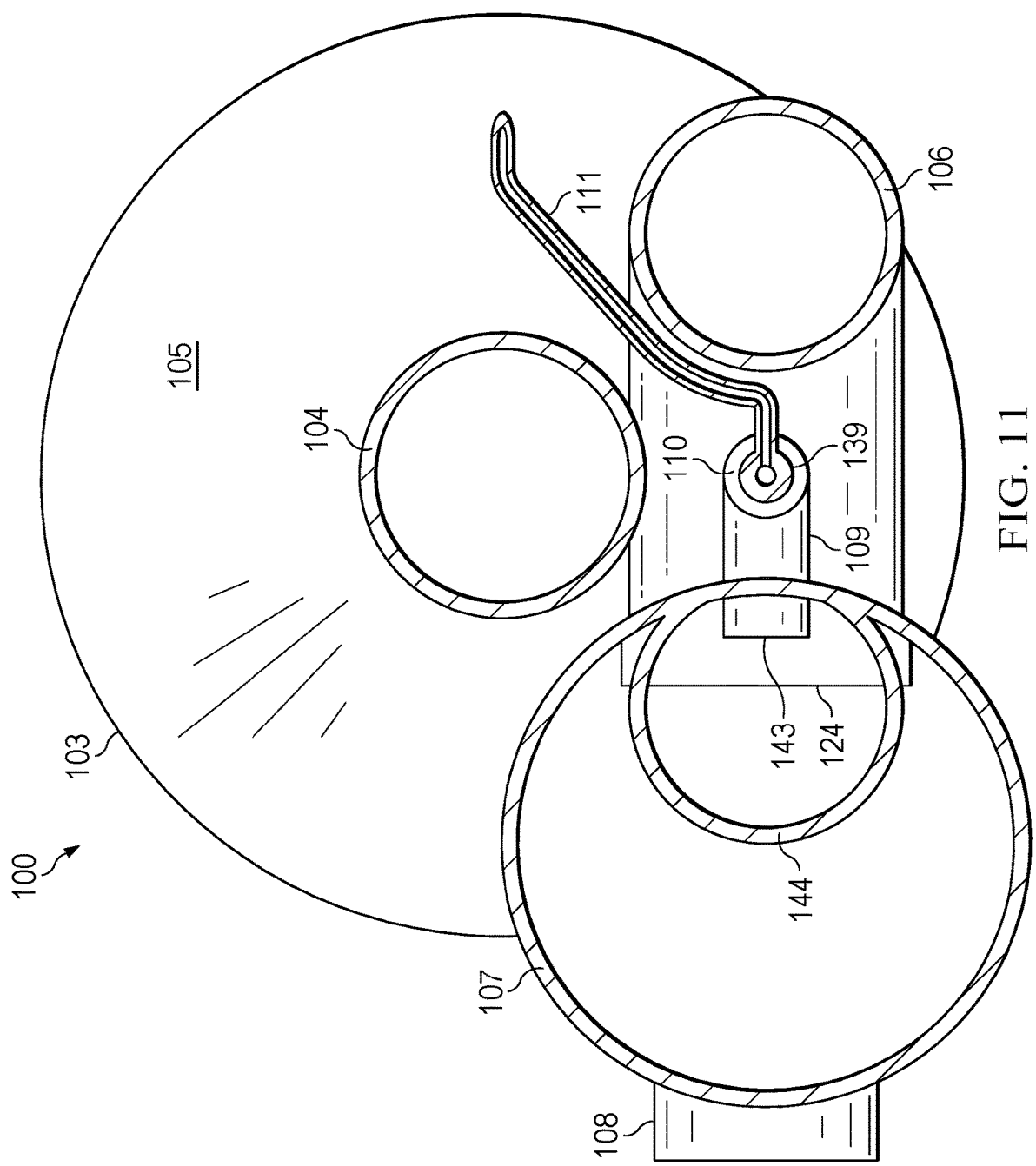
FIG. 11 is a top-down sectional view of the first embodiment of the present invention.

FIG. 11 illustrates a top-down sectional view of the same embodiment 100 of the current disclosure that is illustrated in FIGS. 1-10, where the section is taken along the section line 11-11 specified in FIG. 8.

Figure 12:
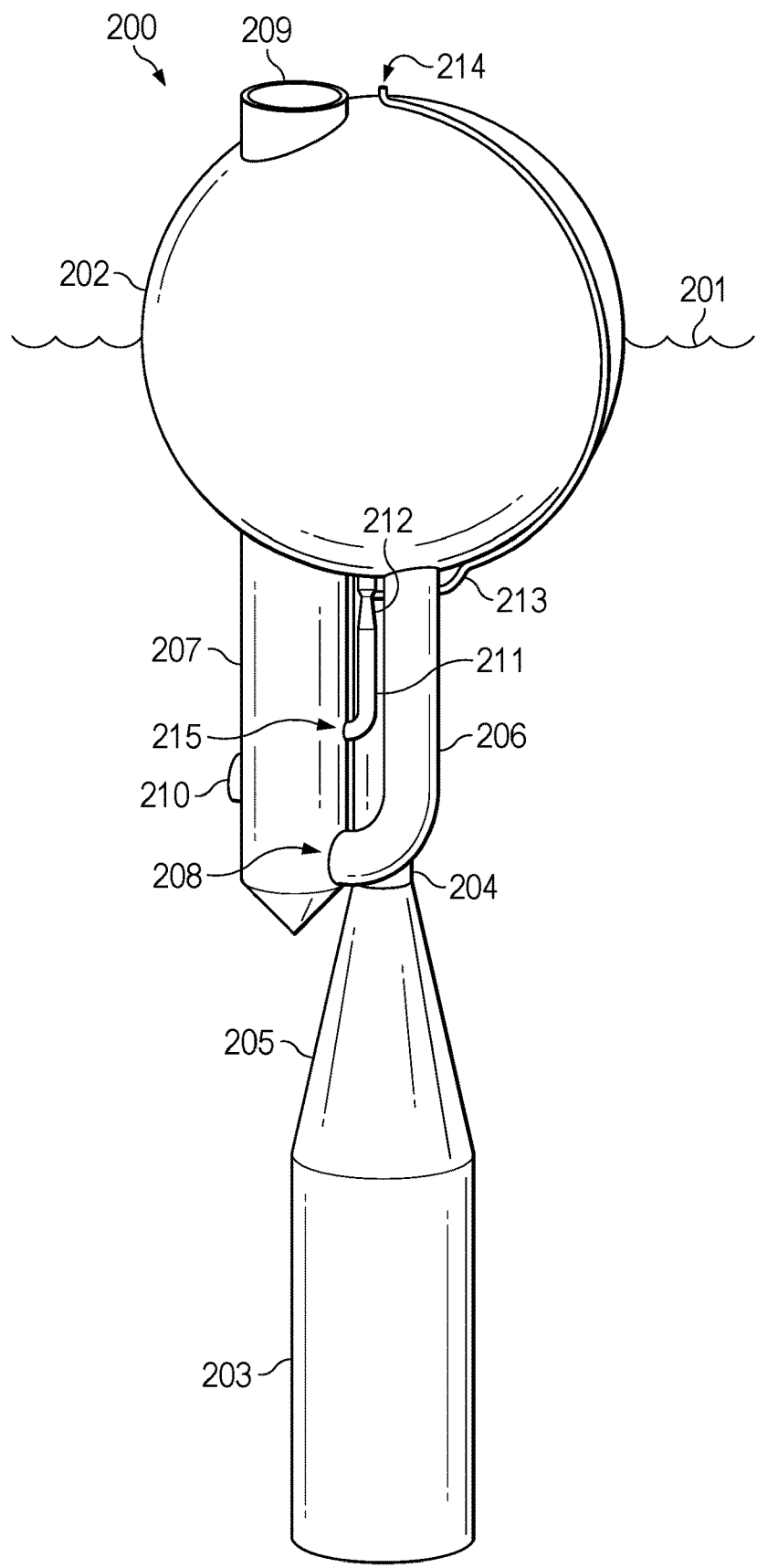
FIG. 12 is a side perspective view of a second embodiment of the present invention.

FIG. 12 illustrates a side perspective view of an embodiment 200 of the current hydrodynamic-pump disclosure. The embodiment floats adjacent to an upper surface 201 of a body of water over which waves tend to pass. The embodiment comprises a hollow buoyant enclosure 202, and/or buoy, and an attached injection tube 203-205, comprised of three sections. A bottommost, approximately cylindrical section 203 of the injection tube is characterized by a relatively large diameter and cross-sectional area. An uppermost approximately cylindrical section 204 of the injection tube is characterized by a relatively small diameter and cross-sectional area. And a middle section 205 of the injection tube is characterized by a constricted, narrowing, sloped, and/or frustoconical, portion of the tube which fluidly connects the uppermost 204 and lowermost 203 sections, and wherein the bottommost end of the middle section has a diameter equal to that of the bottommost section and the uppermost end of the middle section has a diameter equal to that of the uppermost section.

Depending from the buoy 202 is a turbine inlet pipe 206 within a lower portion of which is positioned a water turbine (not visible). The turbine inlet pipe is joined to an effluent buffer chamber 207, by means of an effluent-buffer junction 208. A lower mouth (not visible) of the turbine inlet pipe, wherein the water turbine is positioned, fluidly connects the turbine inlet pipe to an interior of the effluent buffer chamber, and water effluent flowing out of the water turbine flows into an interior (not visible) of the effluent buffer chamber. An upper mouth 209 of the effluent buffer chamber fluidly connects an interior of the effluent buffer chamber to the atmosphere above and outside the embodiment.

Water flows from a water reservoir (not visible) within the buoy through the turbine inlet pipe and therethrough to and through the water turbine (not visible). The effluent from the water turbine flows into an interior (not visible) of the effluent buffer chamber 207. Water (not visible) within the effluent buffer chamber then flows into the body of water 201, on which the embodiment 200 floats, through an effluent-buffer-tube drain 210. The (transverse) cross-sectional area of the effluent buffer chamber drain is significantly less than the (horizontal) cross-sectional area of the effluent buffer chamber.

Water from the water reservoir (not visible) inside the buoy 202 flows into a reservoir-stabilizing-trompe air ingestion pipe 211. As relatively highly pressurized water flows from the water reservoir and into and through the air ingestion pipe, it flows to and through a constricted and/or Venturi section 212 of that pipe, thereby tending to create a region of low pressure within the water stream flowing therethrough. At the narrowest point in the Venturi section, i.e., at the Venturi throat, or aspirator/ejector, where the pressure of the water stream flowing through the air ingestion pipe is reduced, and/or minimal, the air ingestion pipe is fluidly connected to an air supply pipe 213 at a water-air mixture junction (not visible). And, as water flows through the Venturi section of the air ingestion pipe, air is drawn from the atmosphere into and through an upper mouth 214, and/or aperture, of the air supply pipe, and therethrough into and through the air supply pipe. Air within the air supply pipe is drawn into the Venturi section of the air ingestion pipe at, and/or through, the water-air mixture junction where it tends to mix and/or combine with the water flowing therethrough.

The air/water mixture that flows down through the air ingestion pipe 211, and away from the water-air mixture junction (not visible), then flows through and out of a lower mouth (not visible) of the air ingestion pipe at lower end of the air ingestion pipe (adjacent to the junction 215 of the air ingestion pipe and the effluent buffer chamber 207) and therethrough into a cylindrical separation gallery (not visible) positioned within the interior (not visible) of the effluent buffer chamber. An interior of the cylindrical separation gallery is fluidly connected to the interior of the effluent buffer chamber. The air bubbles flowing out of the air ingestion pipe, and into the cylindrical separation gallery, tend to rise within the water inside the cylindrical separation gallery, and flow upward through an air supplementation pipe and therethrough join the air within the embodiment's air pocket (not visible) within an interior of the buoy 202, thereby tending to increase the amount and pressure of air within that air pocket.

Figure 13:
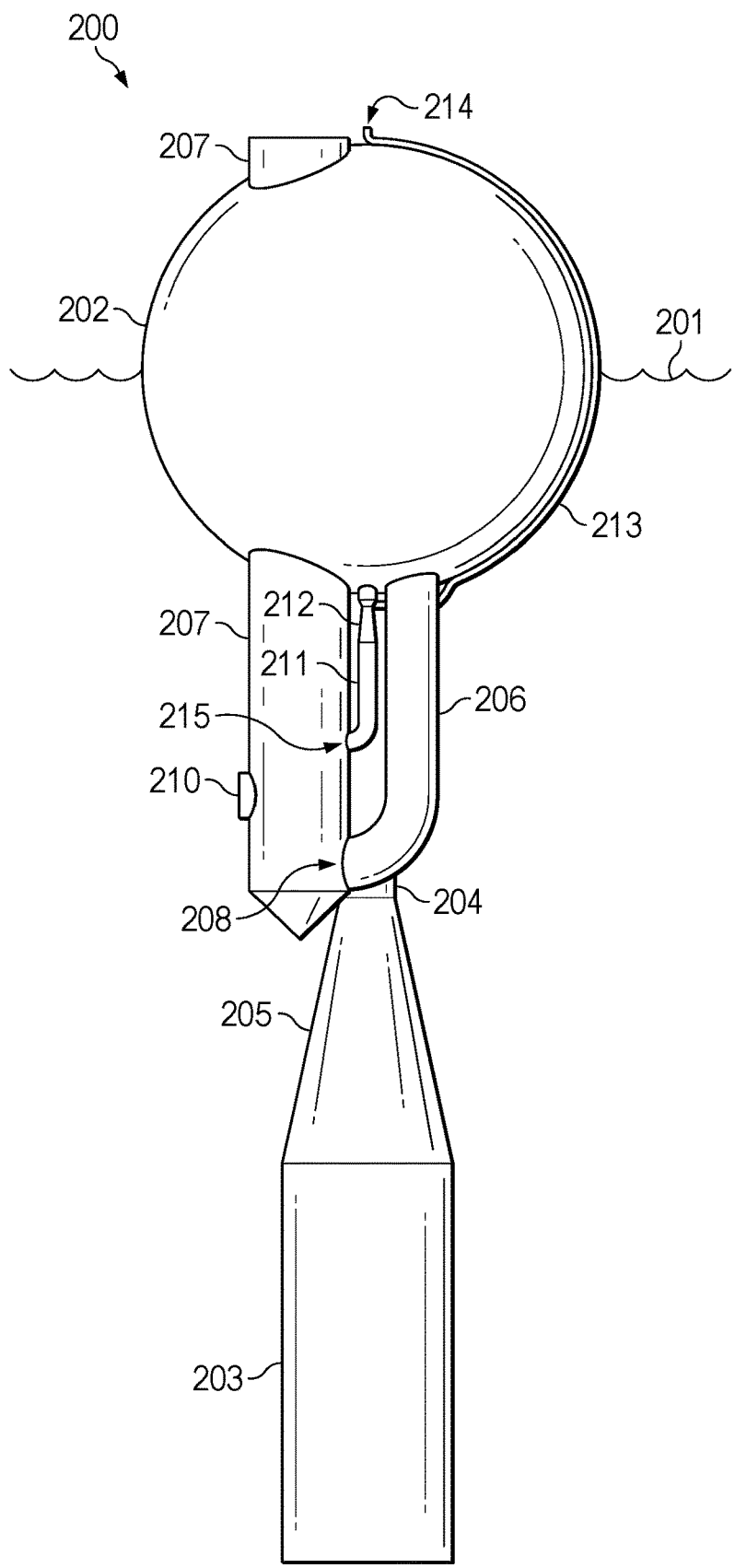
FIG. 13 is a side view of the second embodiment of the present invention.

FIG. 13 illustrates a side view of the same embodiment 200 of the current disclosure that is illustrated in FIG. 12.

Figure 14:
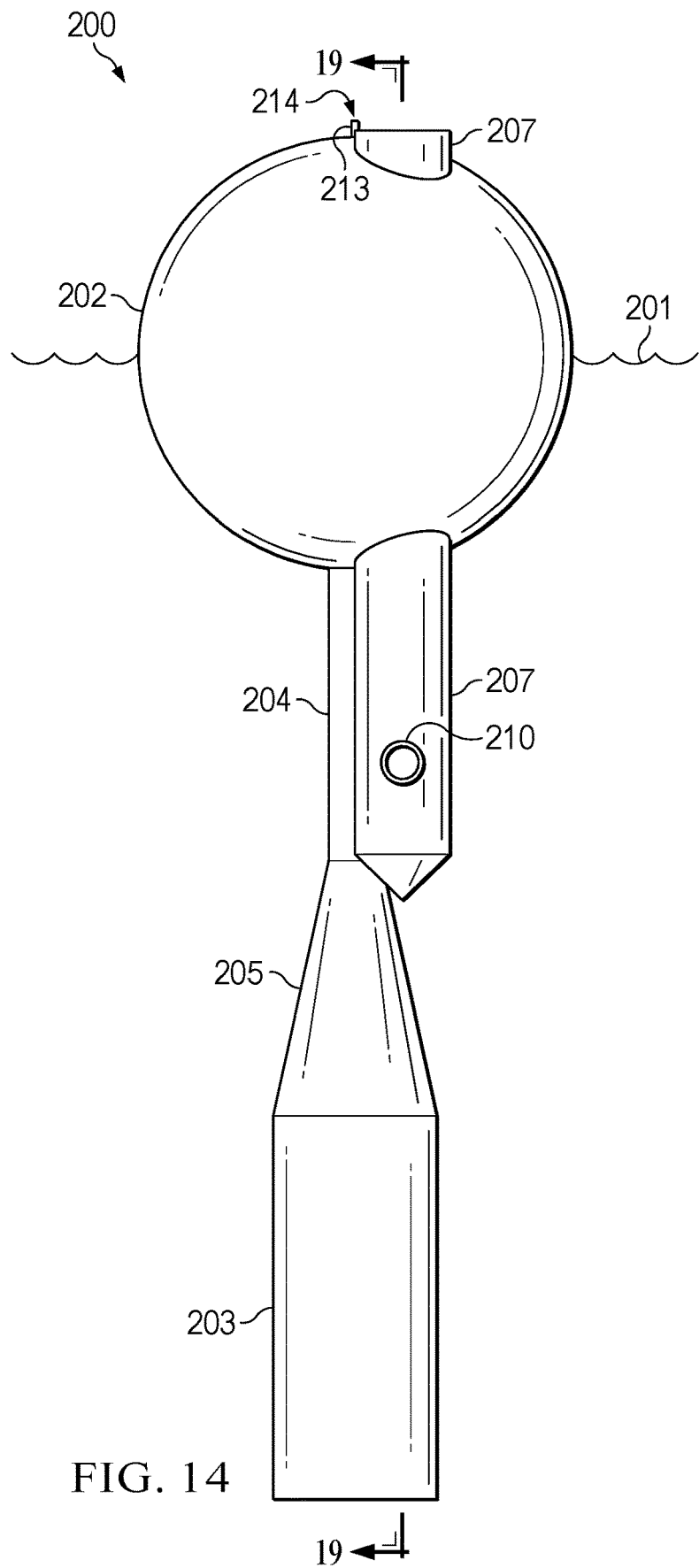
FIG. 14 is a side view of the second embodiment of the present invention.

FIG. 14 illustrates a side view of the same embodiment 200 of the current disclosure that is illustrated in FIGS. 12 and 13.

Figure 15:
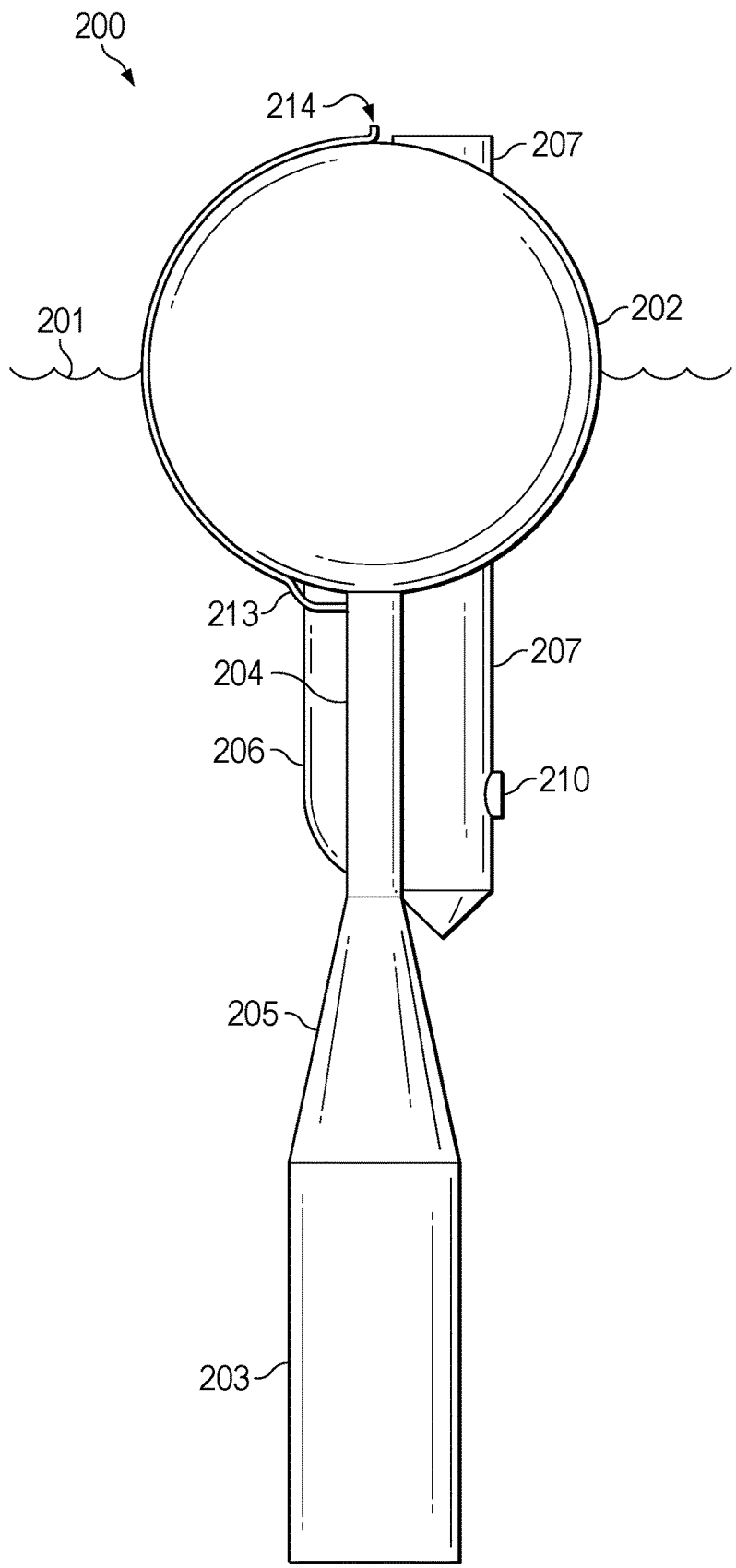
FIG. 15 is a side view of the second embodiment of the present invention.

FIG. 15 illustrates a side view of the same embodiment 200 of the current disclosure that is illustrated in FIGS. 12-14.

Figure 16:
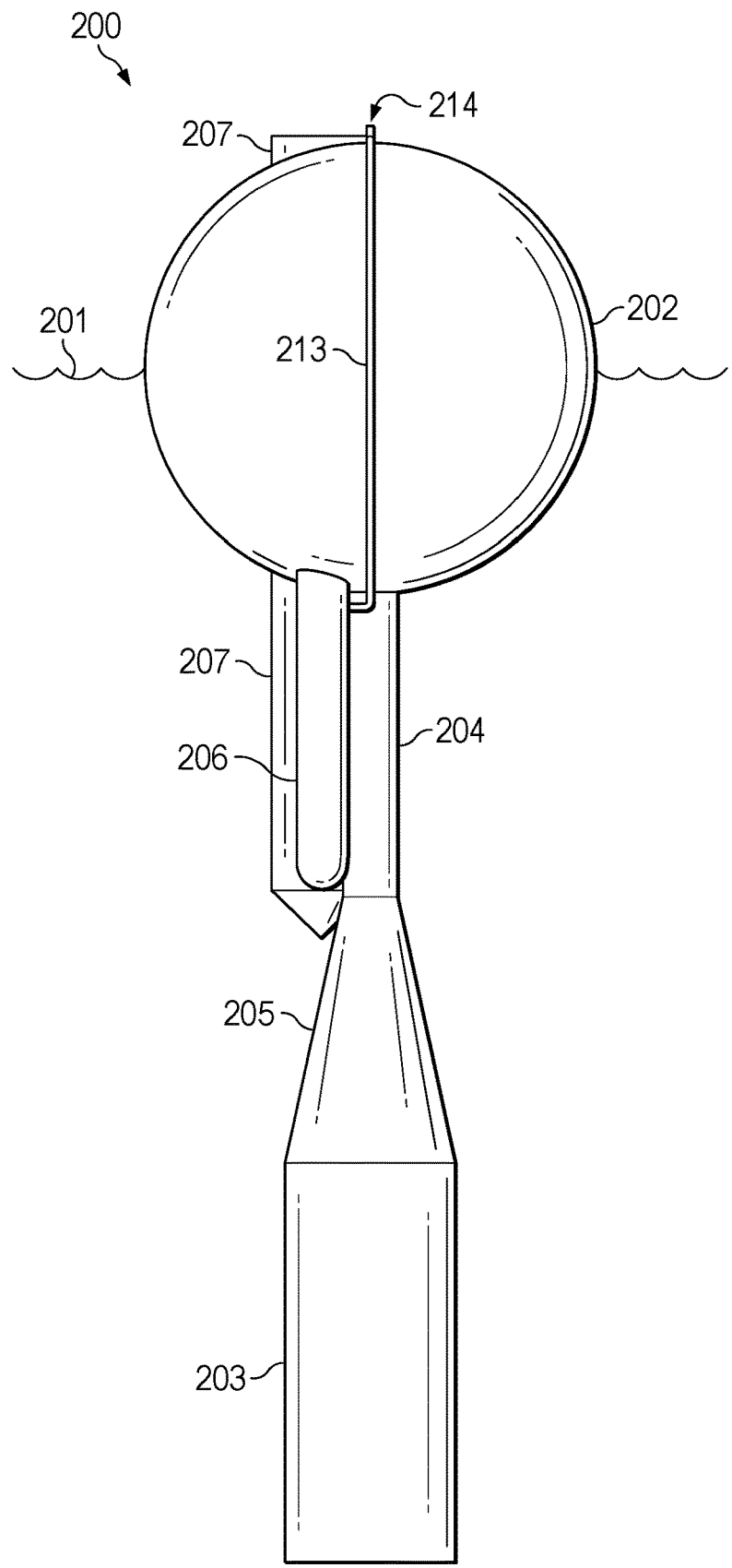
FIG. 16 is a side view of the second embodiment of the present invention.

FIG. 16 illustrates a side view of the same embodiment 200 of the current disclosure that is illustrated in FIGS. 12-15.

Figure 17:
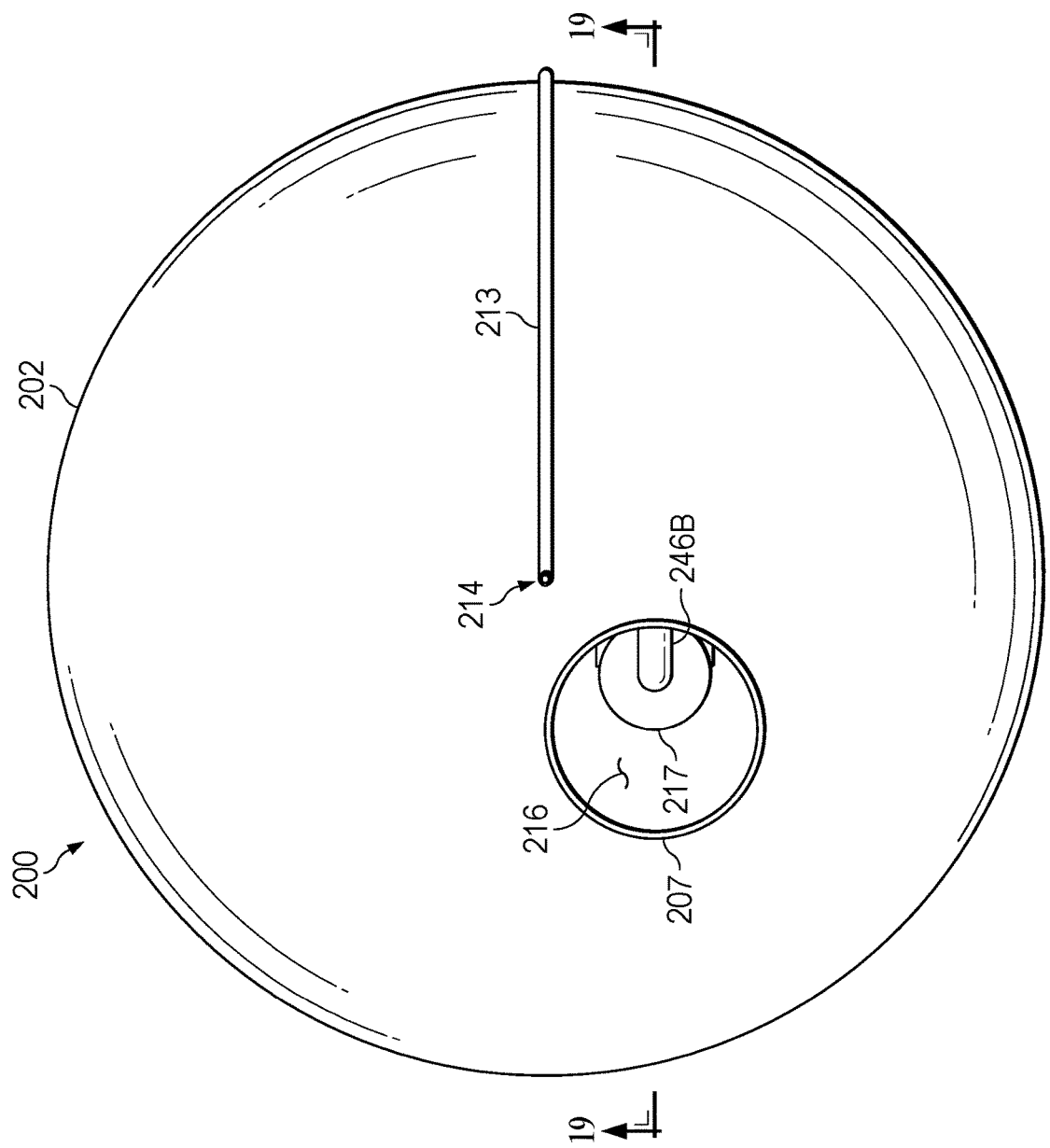
FIG. 17 is a top-down view of the second embodiment of the present invention.

FIG. 17 illustrates a top-down view of the same embodiment 200 of the current disclosure that is illustrated in FIGS. 12-16.

Visible through the upper mouth 216 of the effluent buffer chamber 207 is the top, and/or upper side, of the cylindrical separation gallery 217 that is positioned within, and fluidly connected to the interior of the effluent buffer chamber through an aperture at its lower end. Carrying air, and/or directing a flow of air, from an upper portion of the cylindrical separation gallery and into an interior of the embodiment's buoy 202, is an air supplementation pipe 246B.

Figure 18:
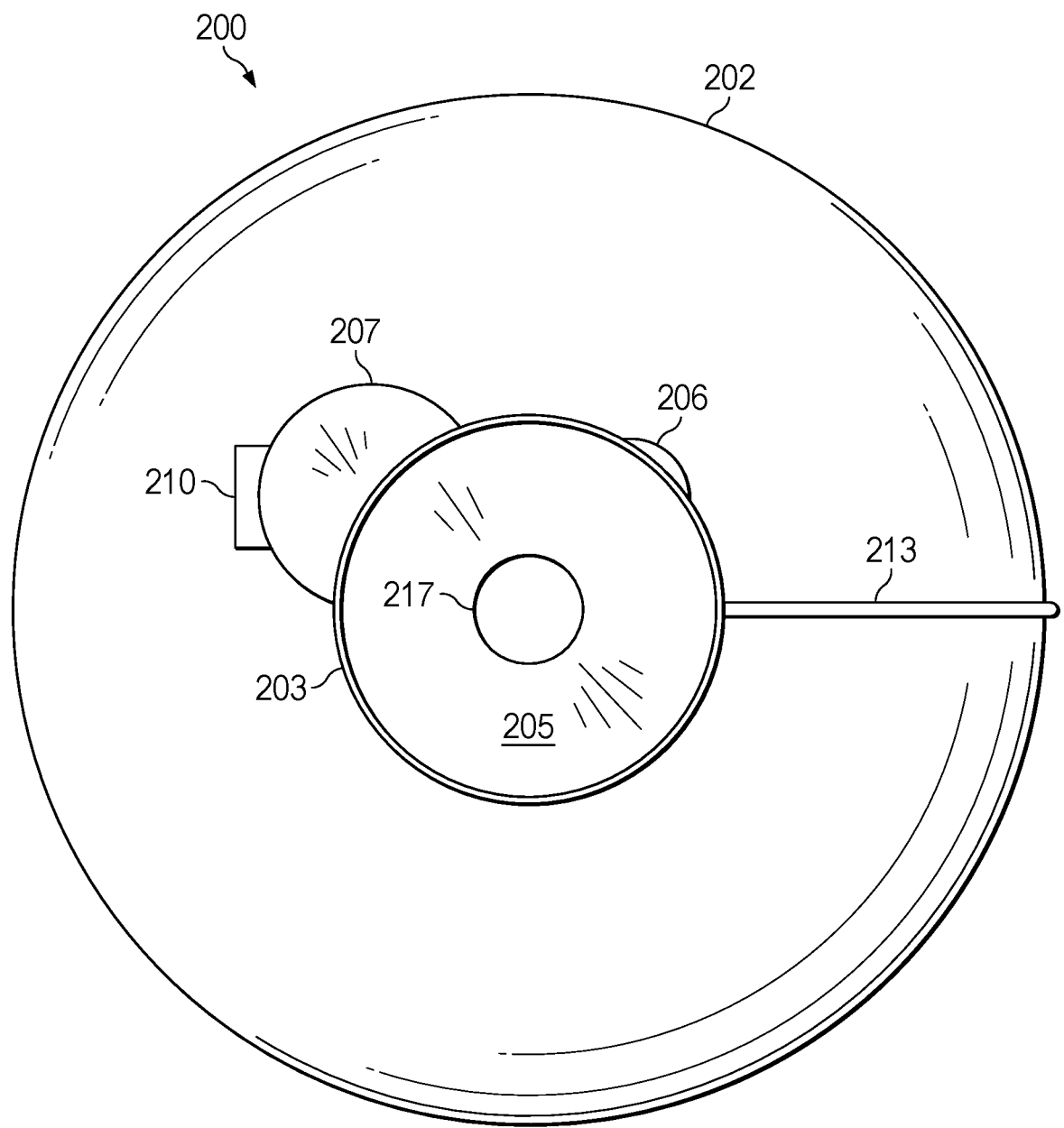
FIG. 18 is a bottom-up view of the second embodiment of the present invention.

FIG. 18 illustrates a bottom-up view of the same embodiment 200 of the current disclosure that is illustrated in FIGS. 12-17. Visible inside injection tube 203/205 is an upper mouth 217 of that injection tube through which water is periodically ejected from an interior of the injection tube and into an interior of buoy 202.

Figure 19:
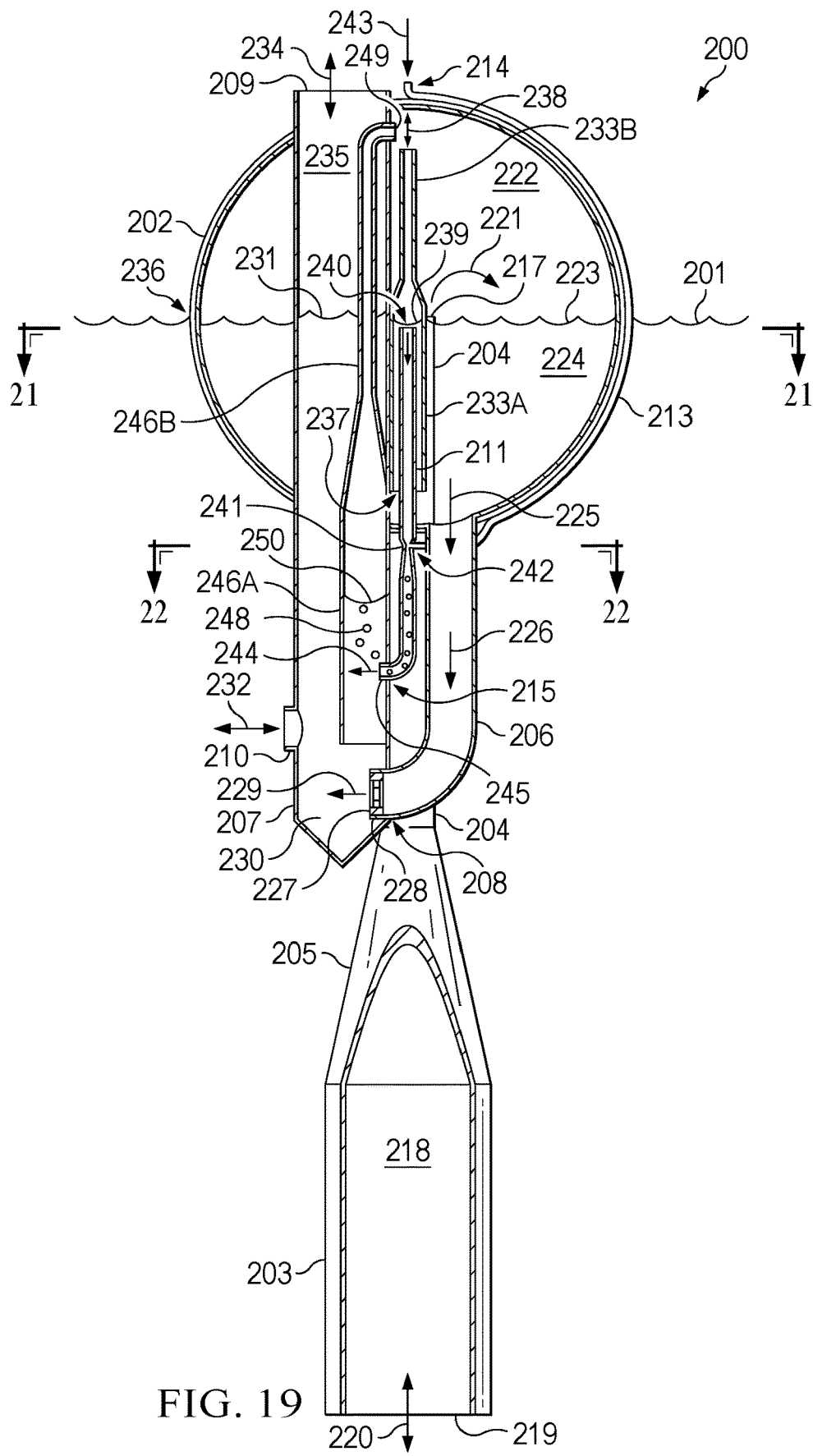
FIG. 19 is a side sectional view of the second embodiment of the present invention.

FIG. 19 illustrates a side sectional view of the same embodiment 200 of the current disclosure that is illustrated in FIGS. 12-18, where the section is taken along the section line 19-19 specified in FIGS. 14 and 17.

As the hydrodynamic pump embodiment 200 moves up and down in response to a passage of waves across the upper surface 201 of the body of water on which it floats, the inertia of the water 218 inside the pump's injection tube 203-205 prevents that water from immediately following the up-and-down movements of the hydrodynamic pump 200, i.e., prevents that water from moving synchronously with the vertical movements of the hydrodynamic pump.

When the hydrodynamic pump 200 descends from a passing wave crest, the constricted portion 205 of its injection tube 203-205 tends to push the water 218 within the injection tube downward. When the pump subsequently ascends on an approaching wave crest, the downward momentum of the water 218 within the pump's injection tube causes that water within the injection tube to continue moving downward, even as the hydrodynamic pump begins moving upward due to its buoyancy and the wave's rising water surface. However, depth (head) pressure of the water outside a lower mouth 219 of the injection tube slows the water's descent and eventually reverses it, sending and/or accelerating that water upward. The up-and-down movements of the water within the embodiment's injection tube that result from ambient wave motion at the embodiment tends to cause water to regularly flow 220 in and out of the lower mouth of the injection tube.

By the time the hydrodynamic pump 200 is again descending from a passing wave crest, it will periodically be the case that the water 218 within its injection tube 203-205 is ascending. During such moments of contrary relative motion between the embodiment and the water within its injection tube, the upwardly moving water within its injection tube will tend to collide with the constricted portion 205 of the pump's injection tube, thereby tending to partially arrest that upward ascent of the upwardly flowing water, and also tending to amplify the pressure and upward acceleration of a portion of that rising water, thereby tending to cause portions of such upwardly accelerated water to be ejected 221 from an upper mouth 217 of the pump's injection tube and therefrom into an air pocket 222 positioned within an upper portion of an interior of the hollow buoy 202, and above a reservoir of water 224 positioned within a lower portion of an interior of the hollow buoy. The ejected water tends to fall onto, into, and/or through, an upper surface 223 of that water reservoir, thereby adding the volume of the ejected water to that of the water already there and thereby increasing, and/or raising, a level 223 and/or height of that reservoir upper surface.

The embodiment's air pocket 222 is typically pressurized to a pressure greater than atmospheric, i.e., greater than 100 kilopascals (kPa), e.g., 110-210 kPa.

Water from the water reservoir 224 flows 225 into an upper mouth and/or aperture of the turbine inlet pipe 206. It then flows 226 through the turbine inlet pipe to the embodiment's water turbine 227 which is positioned at, adjacent to, and/or within, a lower mouth 228 of the turbine inlet pipe. Water from the turbine inlet pipe flows into and through the water turbine, and thereafter the water turbine's water effluent flows 229 out of the water turbine and into an interior 230/235 of the embodiment's effluent buffer chamber 207.

The effluent of the water turbine 227 flows 229 into an interior of the embodiment's effluent buffer chamber 207 where it joins, and/or is added to, the water 230 already accumulated within that effluent buffer chamber. Due to the effluent-buffer-tube drain 210, which provides a fluid connection between the water 230 within the effluent buffer chamber and the body of water 201 on which the embodiment floats, as well as an upper mouth 209 of the effluent buffer chamber which provides a fluid connection 234 between the air pocket 235 within the effluent buffer chamber and the atmosphere outside and above the embodiment, the upper free surface 231 of the water within the effluent buffer chamber tends to be positioned at a height, elevation, and/or vertical distance, approximately equal to that of the upper surface 201 of the body of water on which the embodiment floats. And the depth and/or head pressure of the water within the effluent buffer chamber is approximately equal to the head pressure of the water outside the embodiment with respect to any approximately equal relative distance below the upper surface 201 of the body of water on which the embodiment floats.

Thus, when effluent flows 229 out of the water turbine 227 and into the effluent buffer chamber 207, its outflow is resisted by approximately the same amount of back pressure as would be experienced by effluent flowing out of a water turbine directly into the body of water on which that respective embodiment floats. Thus, under nominal operational and/or environmental conditions, the use of an effluent buffer chamber, such as the one illustrated in FIGS. 12-19, neither tends to increase nor decrease the net pressure across a respective water turbine, or to increase nor decrease the hydraulic power available to a respective water turbine. When water effluent flows from the water turbine, and into the effluent buffer chamber, then, an approximately equal amount of water tends to flow 232 out of the effluent-buffer-tube drain 210 of the effluent buffer chamber, i.e., thereby tending to preserve and/or maintain the vertical position, and/or height, of the upper free surface 231 of the water within the effluent buffer chamber with respect to the vertical position, and/or height, of the upper surface 201 of the body of water outside the embodiment.

The upper mouth 209 of the effluent buffer chamber 207 fluidly connects 234 the interior 235 of the effluent buffer chamber to the atmosphere above and outside the embodiment. Thus, the pressure of the air 235 within the upper portion of the effluent buffer chamber tends to always, constantly, and/or consistently, equal the pressure of the air outside the embodiment.

As the embodiment 200 accelerates up and down in response to the passage of waves across the surface 201 of the body of water on which it floats, the wave-induced accelerations of the embodiment tend to be added to the gravitational accelerations that determine the effective "weight" or downward pressure of the water within the embodiment. Therefore, as the embodiment accelerates up and down in response to a passage of waves, the "effective weight" and/or the "effective density" of the water within the embodiment tends to increase and decrease, respectively.

With respect to a hydrodynamic pump of the prior art, in which a water turbine discharges its water effluent directly into the body of water on which the embodiment floats, as the embodiment accelerates upward, and as the weight of the water within a respective turbine inlet pipe pushing down upon the water turbine increases, the net pressure across the water turbine increases, sometimes significantly. Likewise, when such a hydrodynamic pump of the prior art accelerates downward, and as the weight of the water within a respective turbine inlet pipe pushing down upon the water turbine decreases, the net pressure across the water turbine decreases, sometimes significantly. These variations, changes, and/or oscillations in, and/or of, the net pressure across the water turbine of a hydrodynamic pump of the prior art require a relative overbuilding of the water turbine and the operatively connected generator so that they can withstand these relatively rapid and frequent fluctuations in water-turbine net pressure, and the consequent mechanical stresses. These variations, changes, and/or oscillations of the net pressure across the water turbine of a hydrodynamic pump of the prior art also cause similar fluctuations in the electrical power produced by the generator, thereby necessitating relatively complex and expensive modifications to the respective power-conditioning electronics and electrical loads.

The magnitude of an acceleration-induced change in the effective weight of a column of water tends to vary with the specific height of that column of water. Since an acceleration-induced change in the effective weight of a column of water can be thought of as a corresponding increase in the density of the water within that column of water, the increase in the hydrostatic pressure beneath a column of water of a specific height will be proportional to the acceleration-induced change in the density of that water.

With respect to a specific wave-induced acceleration of an embodiment of the present disclosure, the magnitude of a corresponding and/or resultant change in the "effective weight" of a column of water, with respect to a particular point and/or elevation within that column of water, will vary approximately linearly with the depth of the particular point, and/or the height of the water column above the particular point, as well as with the magnitude of the acceleration imposed on that column of water.

With respect to the effluent-buffering hydrodynamic pump 200 of the present disclosure, illustrated in FIGS. 12-19, the relative height of the upper surface 231 of the water within the embodiment's effluent buffer chamber 207, is approximately (though not precisely) equal to the relative height of the upper surface 223 of the water within the embodiment's water reservoir 224. Therefore, the effluent-buffering hydrodynamic pump 200 of the present disclosure, illustrated in FIGS. 12-19, significantly reduces the magnitude of acceleration-induced fluctuations in the net pressure of the respective water turbine 227 in comparison to the fluctuations in the net pressure which tend to adversely affect the water turbine of hydrodynamic pumps of the prior art. Because changes in the effective weight of the water flowing 226 into and through the water turbine of the hydrodynamic pump of the present disclosure are approximately equal to, canceled by, offset by, and/or balanced by, changes in the effective weight of the water 230 within the effluent buffer chamber into which the water turbine's effluent flows, the resulting changes in the net pressure are typically very small and/or of a relatively insignificant magnitude.

The height of the water 230 above the effluent side of the water turbine 227 within the embodiment's 200 effluent buffer chamber 207 is approximately equal to the height of the water 224 (within the water reservoir) above the inlet side of the water turbine. Therefore, when the embodiment accelerates upward in response to an approaching wave crest, the increase in the effective weight of the water 224 flowing into the water turbine is approximately balanced, offset, and/or cancelled, by a simultaneous increase in the effective weight of the water 230 resisting the outflow of the water turbine's effluent. Similarly, when the embodiment accelerates downward in response to an approaching wave trough, the decrease in the effective weight of the water 224 flowing into the water turbine is approximately balanced, offset, and/or cancelled, by a simultaneous decrease in the effective weight of the water 230 resisting the outflow of the water turbine's effluent.

Because the hydrodynamic pump 200 of the present disclosure includes an effluent buffer chamber 207, the net pressures experienced by the pump's water turbine 227 are not adversely, if at all, affected and/or impacted by fluctuations in the vertical accelerations of the hydrodynamic pump.

Thus, the effluent buffer chamber 207 of the present disclosure removes a costly and inefficient recurring fluctuation in the net pressure to which a water turbine 227 of a hydrodynamic pump of the prior art is exposed, and the stress of which may shorten the operational lifetime of such a water turbine, and its operatively connected electronics.

Fluctuations in the net pressure of a water turbine of a hydrodynamic pump of the prior art can also be caused by changes in the back pressure resisting the outflow of effluent from the water turbine, said changes resulting from changes in the depth, draft, and/or waterline of the hydrodynamic pump, i.e., by its bobbing relative to the free surface of the body of water on which it floats.

The back pressure opposing and/or resisting any outflow of effluent from the water turbine 227 of a hydrodynamic pump 200 of the present disclosure is a sum of the head pressure associated with, and/or caused by, the depth of the water turbine relative to the upper surface 231 of the water 230 within the effluent buffer chamber 207. And, because of the relatively small cross-sectional area of the effluent-buffer-tube drain 210, through which water flows 232 out of, (and into) the effluent buffer chamber, changes in the depth of the water turbine relative to the upper surface of the water within the effluent buffer chamber tend to occur slowly in response to changes in the depth, draft, and/or waterline of the hydrodynamic pump, i.e., much more slowly than they would otherwise occur in the absence of the moderating effect of the effluent buffer chamber.

With respect to a hydrodynamic pump 200 of the present disclosure, the back pressure opposing and/or resisting any outflow 229 of effluent from the water turbine is not an immediate consequence, at least not in the short term, of the head pressure associated with, altered by, and/or caused by, the depth of the effluent-buffer-tube drain 210 relative to the upper surface 201 of the body of water on which the embodiment floats. Said effluent-buffer-tube drain 210 effectively insulates, and/or isolates, at least partially and for a short time, the effect and/or impact that varying levels of submergence of the hydrodynamic pump have on the pressure resisting the outflow of effluent from the hydrodynamic pump's water turbine 227.

As the hydrodynamic pump 200 of the present disclosure moves up and down in response to the passage of waves across the surface 201 of the body of water on which it floats, it tends to "pop out" of the water, and it tends to, at least partially, submerge. Such popping out of the water, and being partially submerged within the water is referred to as "bobbing" and this tends to be a characteristic of hydrodynamic pumps of both the prior art and the present disclosure.

As the waterline 236 of the embodiment 200 fluctuates above and below its resting, nominal, average, and/or typical position on the embodiment, so too the depth of the effluent-buffer-tube drain 210 of the effluent buffer chamber 207 increases and decreases, respectively. Because of this, the hydrostatic (head and/or depth) pressure of the water outside the embodiment, and outside the effluent-buffer-tube drain, which opposes and resists the outflow 232 of water from the effluent-buffer-tube drain, increases and decreases, respectively.

When the distance of the effluent-buffer-tube drain 210 to the embodiment's waterline 236 increases, so too does the height of the water between the effluent-buffer-tube drain and the surface 201 of the body of water on which the embodiment floats. The resulting increase in the height of the water between the effluent-buffer-tube drain and the surface 201 increases the head pressure of the water outside the effluent-buffer-tube drain, which opposes and resists any outflow 232 of water from the interior 230 of the effluent buffer chamber 207 to the body of water.

When the embodiment's waterline 236 rises, and the hydrostatic and/or head pressure of the water outside the effluent-buffer-tube drain 210 increases, then water 201 will tend to flow 232 into the effluent buffer chamber 207 through its effluent-buffer-tube drain 210, thereby tending to raise and/or elevate the upper surface 231 of the water 230 within the effluent buffer chamber, thereby increasing the pressure of the water 230 resisting the outflow 229 of effluent from the water turbine 227. However, because the cross-sectional area of the effluent-buffer-tube drain is substantially less and/or smaller than the cross-sectional area of the effluent buffer chamber, the rate at which the upper surface of the water within the effluent buffer chamber rises in response to a raising of the embodiment's waterline, tends to be relatively slow, e.g., taking many seconds to reach a new greater equilibrium height and/or elevation within the effluent buffer chamber. And the greater the ratio of the cross-sectional area of the effluent buffer chamber to the cross-sectional area of the effluent-buffer-tube drain, the slower the rate at which the upper surface of the water within the effluent buffer chamber will rise.

As the elevation of the upper surface 231 of the water 230 within the effluent buffer chamber 207 rises, so too the back pressure opposing and/or resisting the outflow 229 of effluent from the water turbine 227 increases (all else being equal), which reduces the net pressure across the water turbine, and reduces the power that the water turbine is able to produce.

The relatively slow increase in the height of the upper surface 231 of the water 230 within the effluent buffer chamber 207, and the associated relatively slow resulting increase in the back pressure of the water turbine 227, is preferable to the relatively sudden, if not instantaneous, increase in the back pressure associated with an increase in the depth of the unbuffered effluent port of a hydrodynamic pump of the prior art and/or disclosure.

The relatively slow increase in the back pressure associated with the buffering provided by the effluent buffer chamber 207 of a hydrodynamic pump of the present disclosure tends to be less stressful on a water turbine, its blades, its bearings, and its respective operatively connected generator, power electronics, and electrical load. Furthermore, because typical ocean waves are characterized by periods of 10-15 seconds, a slow increase in the back pressure resisting the outflow 229 of effluent from a water turbine 227 in a hydrodynamic pump of the present disclosure that results from a rising of its waterline 236, and/or an increase in the depth, of a hydrodynamic pump of the present disclosure will likely not have time to progress very far before the waterline again begins to fall, and the depth again begins to decrease, which will tend to stop and reverse any relatively slight increase in the back pressure of the water turbine that may have occurred before the reversal.

When the distance of the effluent-buffer-tube drain 210 to the embodiment's waterline 236 decreases, so too does the height of the water between the effluent-buffer-tube drain and the surface 201 of the body of water on which the embodiment floats. When the distance of the effluent-buffer-tube drain 210 to the embodiment's waterline 236 decreases, so too does the head pressure opposing and/or resisting any outflow 232 from the interior 230 of the effluent buffer chamber 207 to the body of water.

When the embodiment's waterline 236 falls, and the hydrostatic and/or head pressure of the water outside the effluent-buffer-tube drain 210 decreases, then water 230 will tend to flow 232 from, and/or out of, the effluent buffer chamber 207 through the effluent-buffer-tube drain and into the body of water 201 on which the embodiment floats, i.e., flow out at a rate greater than the rate at which effluent from the water turbine 227 is added to the effluent buffer chamber. The outflow of water from the effluent buffer chamber lowers the upper surface 231 of the water 230 within the effluent buffer chamber. However, because the cross-sectional area of the effluent-buffer-tube drain is substantially less than the cross-sectional area of the effluent buffer chamber, the rate at which the upper surface of the water within the effluent buffer chamber falls, tends to be relatively slow, e.g., taking many seconds to reach a new lesser equilibrium height and/or elevation. And the greater the ratio of the cross-sectional area of the effluent buffer chamber to the cross-sectional area of the effluent-buffer-tube drain, the slower the rate at which the upper surface of the water within the effluent buffer chamber will fall.

As the elevation of the upper surface 231 of the water 230 within the effluent buffer chamber 207 falls, so too the back pressure opposing and/or resisting the outflow 229 of effluent from the water turbine 227 decreases, which increases the net pressure across the water turbine, and increases the power that the water turbine is able to produce.

The relatively slow reduction in the height of the upper surface 231 of the water 230 within the effluent buffer chamber 207, and the associated relatively slow decrease in the back pressure of the water turbine 227, is preferable to the impulsive, if not instantaneous, decrease in the back pressure of the water turbine associated with a decrease in the depth of the effluent port of a hydrodynamic pump of the prior art. The relatively slow decrease in the back pressure of a water turbine associated with the buffering provided by an effluent buffer chamber of a hydrodynamic pump of the present disclosure tends to be less stressful on a water turbine, its blades, its bearings, and its respective operatively connected generator, power electronics, and electrical load. Furthermore, because typical ocean waves are characterized by periods of 10-15 seconds, a slow decrease in the back pressure of a water turbine in a hydrodynamic pump of the present disclosure that results from a falling of its waterline, and/or a decrease in the depth, of a hydrodynamic pump of the present disclosure will likely not have time to progress very far before the waterline again begins to rise, and the depth again begins to increase, which will tend to stop and reverse any slight decrease in the back pressure of the water turbine that may have occurred before the reversal.

The embodiment of the present disclosure illustrated in FIGS. 12-19 includes, incorporates, and/or utilizes, a reservoir-stabilizing trompe, similar to the one illustrated in, and explained with respect to the embodiment 100 illustrated in, and explained with respect to, FIGS. 1-11. The principle of operation of the reservoir-stabilizing trompe included within the embodiment 200 illustrated in FIG. 19, as well as most of the mechanical structures, features, mechanisms, and/or components, of which it is comprised, are the same for the reservoir-stabilizing trompes of embodiment 100 (FIGS. 1-11) and embodiment 200. A detailed explanation of the design of the reservoir-stabilizing trompe of embodiment 200, and its operation, may be found in the figures, and corresponding figure descriptions, related to FIGS. 1-11. Only a relatively simple repetition of that prior explanation will be included here.

When the heights of waves grow larger, and/or the periods of waves grow shorter, the relative amount of energy imparted to an embodiment of the present disclosure tends to increase. Conversely, when the heights of waves grow smaller, and/or the periods of waves grow longer, the relative amount of energy imparted to an embodiment of the present disclosure tends to decrease. The amount of energy imparted to an embodiment of the present disclosure tends to determine the rate at which water is pumped into an embodiment's water reservoir. And the pressure of the air within an embodiment's air pocket tends to determine, at least in part, both the rate at which water is pumped into an embodiment's water reservoir, and the amount of pressure potential energy contained within each unit of the water within an embodiment's water reservoir.

The higher the pressure of the air pocket, the greater the amount of pressure potential energy per unit of water-reservoir water, and the lower the rate at which water tends to be pumped into the water reservoir. The lower the pressure of the air pocket, the lower the amount of pressure potential energy per unit of water-reservoir water, and the greater the rate at which water tends to be pumped into the water reservoir.

If the pressure of the air pocket is too high (with respect to the energy of the ambient wave conditions) then the water reservoir will tend to lose water through its water turbine more quickly than new water is added to its water reservoir. And, if the pressure of the air pocket is too low (with respect to the energy of the ambient wave conditions) then water will tend be added to its water reservoir more quickly than water is able to flow out through the water turbine, causing some of the water within the water reservoir, that might have otherwise been converted into useful electrical power, to flow back into, and down through, the embodiment's injection tube and the body of water fluidly connected therethrough. Furthermore, when the pressure of the air pocket is too low, then the amount of energy and/or power that can be extracted from each unit of water within the embodiment's water reservoir will be lower than it might have otherwise been (and unnecessarily so).

For these reasons, the optimal amount of power (energy per unit time) that can be captured by an embodiment of the present disclosure, and converted to electrical power thereby, is achieved when the air pressure is just high enough to permit the rate at which wave-driven pumping of water into the water reservoir to just equal the rate at which water flows out of the water reservoir and through the embodiment's water turbine. Thus, an optimal pressure of an embodiment's air pocket, permits water to flow into the embodiment at the maximum rate that can be processed by the embodiment's water turbine, and raises the unit pressure-potential energy of the water within the embodiment's water reservoir to the maximum possible level at that maximal water inflow rate.

Raising the pressure of an embodiment's air pocket to an optimal level may be achieved, in part, by constantly adding air to the air pocket, thereby incrementally increasing the pressure of the air pocket, whenever the water reservoir contains a surplus of water and/or is receiving water at a rate greater than the rate at which water is flowing out of the water reservoir through the embodiment's water turbine. And, in a complementary fashion, reducing the pressure of an embodiment's air pocket to an optimal level may be achieved, in part, by constantly removing air from the air pocket, thereby incrementally decreasing the pressure of the air pocket, whenever the level of water within the water reservoir is too low and/or the water reservoir is losing water at a rate greater than the rate at which water is being added to the water reservoir.

The embodiment of the present disclosure illustrated in FIGS. 12-19 maintains an optimal pressure of its air pocket by including, incorporating, and/or utilizing, a reservoir-stabilizing trompe, similar to the one illustrated in, and explained with respect to, FIGS. 1-11.

Hydrodynamic pumps of the prior art lack the ability to passively control the level of water within their respective water reservoirs. Therefore, if they are to be able to adapt to wave climates of changing energy levels, then these hydrodynamic pumps of the prior art must either incorporate mechanical air compressors, which can fail and thereafter become difficult to repair or replace when a respective hydrodynamic pump is floating in an ocean many miles from shore, or they must operate with a single, unchanging, and/or approximately constant, baseline, nominal, resting, and/or average air-pocket pressure and therefore suffer inefficiencies at all but one, or few, of the wave climates that it is likely to encounter.

A hydrodynamic pump of the prior disclosure, which lacks a mechanical air compressor, can operate efficiently at only a particular rate of water inflow from its injection tube. And, when waves are relatively energetic, and such a hydrodynamic pump of the prior disclosure is adding water to its water reservoir faster than water is flowing out of its water reservoir through its water turbine, then excess water will accumulate and will tend to flow back into the upper mouth of its injection tube and back to the body of water on which the hydrodynamic pump floats. Such water back flow, and the potential energy contained therein, will be lost the hydrodynamic pump thereby representing a potentially significant power and cost inefficiency. Conversely, when waves are relatively weak, and such a hydrodynamic pump of the prior disclosure is failing to add water to its water reservoir as quickly as water is flowing out of that water reservoir through its water turbine, then the water reservoir will become increasingly diminished, causing inefficiencies as previously described.

Water from the embodiment's water reservoir 224 is able to flow into the embodiment's air ingestion pipe shroud 233A through an annular gap 237 at a lower end of the air ingestion pipe shroud that fluidly connects an interior of the air ingestion pipe shroud to the water reservoir. Air is able to flow 238 in and out of the air ingestion pipe shroud 233B through an aperture at an upper end of the shroud. Therefore, the level 239 of water within the air ingestion pipe shroud tends to be at the same average level as the water within the embodiment's water reservoir 224.

The air ingestion pipe shroud 233 covers and surrounds an upper end of the embodiment's reservoir-stabilizing trompe air ingestion pipe 211. The position, height, and/or elevation of an upper mouth 240 of the air ingestion pipe establishes a target and/or threshold level of the respective water reservoir 224, and/or a target height, and/or elevation of the upper surface 223 of the water within the embodiment's water reservoir.

In the configuration illustrated in FIG. 19, the level 223 of water within the embodiment's water reservoir 224, as well as the level 239 of water within the embodiment's air ingestion pipe shroud 233, is above the upper mouth 240 of the air ingestion pipe 211, and therefore above the target level, height, and/or elevation of the upper surface 223 of the water within the embodiment's water reservoir. In this condition and/or configuration, water 239 within the air ingestion pipe shroud flows into the upper mouth of the air ingestion pipe, and thereafter and therethrough downward through and/or within the air ingestion pipe.

As water flows downward through the embodiment's air ingestion pipe 211 it reaches and flows into a constricted, and/or Venturi, portion (212 of FIG. 12) of that air ingestion pipe. At the narrowest point 241, and/or throat, in the constricted, and/or Venturi, and/or aspirator/ejector, portion of that air ingestion pipe, the embodiment's air supply pipe 213 fluidly connects to the channel within the air ingestion pipe at a water-air mixture junction 242. As water flows through the constricted portion of the air ingestion pipe, the water tends to flow more quickly than it does in other portions of the air ingestion pipe, and the static pressure of the water flowing through the constricted portion of the air ingestion pipe tends to drop, thereby tending to create a partial vacuum within the stream of water flowing through that constricted portion of the air ingestion pipe. The partial vacuum created by the constriction within the air ingestion pipe tends to draw air from the air supply pipe into the flowing water thereby tending to entrain bubbles of air within the stream of water flowing down therethrough. Air drawn from the air supply pipe causes atmospheric air to be drawn, and/or to flow 243, into an upper mouth 214, and/or aperture, positioned at an upper end of the air supply pipe.

The stream of water and entrained air bubbles flowing downward through the embodiment's reservoir-stabilizing trompe air ingestion pipe 211 eventually flows 244 through, and out from, a lower mouth 245 of the air ingestion pipe, and therethrough into a pool of water 230 within the effluent buffer chamber 207. The water and entrained air bubbles flowing 244 out of the air ingestion pipe and into the effluent buffer chamber, initially flows into, and is initially surrounded by, a water-filled lower portion of a tubular separation gallery 246A. Water 230 within the effluent buffer chamber is fluidly connected to the water within the tubular separation gallery through the tubular separation gallery's open bottom and/or lower mouth or aperture. Air bubbles that flow 244 out of the lower mouth 245 of the air ingestion pipe, are able to coalesce into larger bubbles, e.g., 248, as they buoyantly rise towards the upper surface 250 of the water within the tubular separation gallery. The bubbles of air deposited, and/or transported, into the water of the tubular separation gallery rise to and through the upper surface of that water, and then flow into an air-filled upper air-supplementation portion 246B of the tubular separation gallery where it then flows through an aperture 249 at an upper end of the air-supplementation portion of the tubular separation gallery and then flows into, and joins, air within the embodiment's air pocket 222.

The air flowing into the embodiment's air pocket 222 from the tubular separation gallery increases the pressure of that air pocket which pushes down the resting, nominal, and/or average level of the upper surface of the water within the embodiment's injection tube 203-205, thereby increasing the energy required to eject water from that injection tube, and thereby tending to reduce the frequency and volume of ejections of water from the upper mouth 217 of that injection tube, and thereby tending to slow the addition of water to the embodiment's water reservoir 224.

The addition of atmospheric air to the air pocket 222 via the air ingestion pipe 211 and the air supply pipe 213, and the resulting gradual, progressive, incremental, and/or continuous, increase in the pressure of the air within that air pocket, will continue until the flow of water into the water reservoir slows enough to cause the upper surface 223 of the water reservoir 224, and the corresponding level 239 of the water within the air ingestion pipe shroud 233, to fall below the upper mouth 240 of the air ingestion pipe.

An alternate embodiment similar to the embodiment 200 illustrated in FIGS. 12-19 includes a diodic valve within the effluent-buffer-tube drain 210 wherein the diodic effluent-buffer-tube drain is configured to maximally, if not completely, obstruct and/or interfere with a flow of water, from the body of water 201 on which the embodiment floats, into the effluent buffer chamber 207; but is configured to minimally, if not at all, obstruct and/or interfere with a flow of water 230 from inside the effluent buffer chamber to, and/or into, the body of water 201 on which the embodiment floats.

Figure 20:
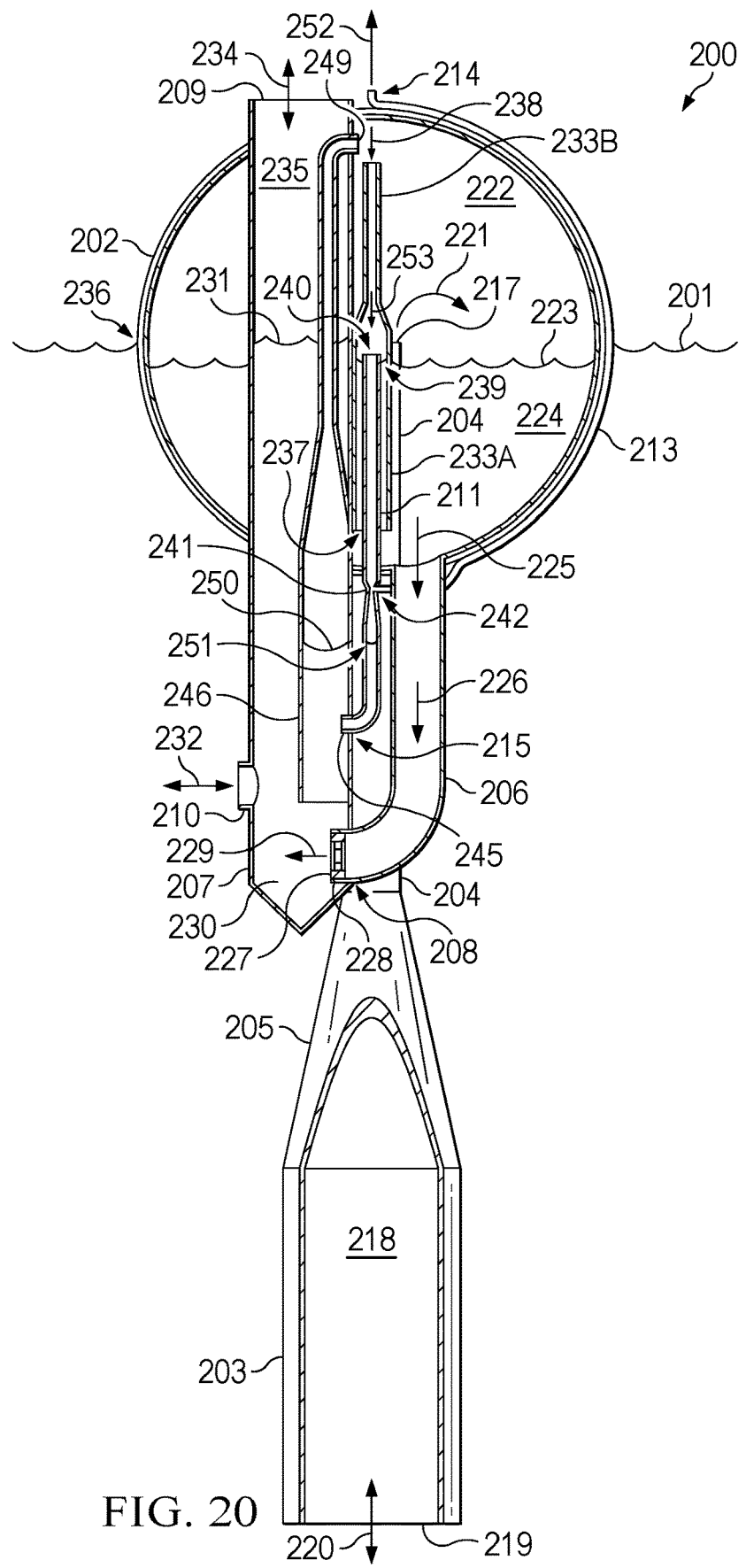
FIG. 20 is a side sectional view of the second embodiment of the present invention.

FIG. 20 illustrates the same side sectional view that is illustrated in FIG. 19, i.e., it illustrates the same embodiment 200 of the current disclosure that is illustrated in FIGS. 12-19, where the section is taken along the section line 19-19 specified in FIGS. 14 and 17.

The side sectional view illustrated in FIG. 19 illustrates the embodiment 200 when it is configured such that, and/or is in an operational state in which, the level of the upper surface 223 of the water reservoir 224 is above the upper mouth 240 of the reservoir-stabilizing trompe air ingestion pipe 211. As illustrated in FIG. 19, and as explained in the corresponding portion of this disclosure, when the level 223 of the water reservoir 224 is above the upper mouth of the air ingestion pipe, water flows down and through that air ingestion pipe, and thereafter entrains bubbles of air within that flow of water, which it then discharges into a water-filled lower portion of the tubular separation gallery 246A, whereafter those bubbles float up to, and join, the embodiment's air pocket 222 through tubular separation gallery upper aperture 249, thereby raising the pressure of that air pocket, and thereby suppressing and/or decreasing the inflow of water to the water reservoir from the injection tube 203-205.

By contrast, the side sectional view illustrated in FIG. 20 illustrates the embodiment 200 when it is configured such that, and/or is in an operational state in which, the level of the upper surface 223 of the water reservoir 224 is below the upper mouth 240 of the reservoir-stabilizing trompe air ingestion pipe 211. When the level 223 of the water reservoir 224 is below the upper mouth of the air ingestion pipe, water is unable to flow into the air ingestion pipe, and the level of the water within that air ingestion pipe falls to a point 251 below the water-air mixture junction 242 thereby allowing air from the embodiment's air pocket 222 to flow through the air-filled upper portion of the air ingestion pipe 211 and therethrough into and through the fluidly-connected air supply pipe 213 whereafter the air escapes 252 the embodiment thereby lowering the pressure of the air within the embodiment's air pocket, and thereby amplifying and/or increasing the inflow of water to the water reservoir from the injection tube 203-205.

When the upper surface 223 of the water reservoir 224, and the manifestation of that upper surface 239 within the air ingestion pipe shroud 233, are below the upper mouth 240 of the air ingestion pipe 211, then the average level of the surface 251 of the water within the air ingestion pipe is pushed down by the pressure of the air pocket 222 to roughly the same average height, level, and/or elevation, as the upper surface 250 of the water within the lower portion of the tubular separation gallery 246.

When the surface 251 of the water within the air ingestion pipe 211 falls to a point below the water-air mixture junction 242, the flow of water from the water reservoir 224 into, and through, the air ingestion pipe, and therethrough into the tubular separation gallery 246 is stopped, thereby preventing the inflow of any additional air, and/or air bubbles, to the embodiment's air pocket 222.

Furthermore, when the surface 251 of the water within the air ingestion pipe 211 falls to a point below the water-air mixture junction 242, air from the embodiment's air pocket 222 is able to flow 238 into the upper mouth and/or aperture of the air ingestion pipe shroud 233B, and therethrough flow 253 into the upper mouth 240 of the air ingestion pipe, after which the air flows down through the air ingestion pipe, into and through the water-air mixture junction 242, and therethrough up and through the air supply pipe 213, and therethrough flows 252 through and out of the upper mouth 214 of the air supply pipe, and into the atmosphere above the embodiment.

The outflow of air from the air pocket 222, and the resulting gradual, progressive, incremental, and/or continuous, reduction of the pressure of that air, will continue until the upper surface 223 of the water reservoir, and the corresponding level 239 of the water within the air ingestion pipe shroud 233, rise above the upper mouth 240 of the air ingestion pipe, or until (on account of decreasing air pressure in the air pocket) the level of water in the air ingestion pipe rises high enough to block air from the air pocket from reaching the water-air mixture junction 242, and therethrough reaching the air supply pipe 213.

Figure 21:
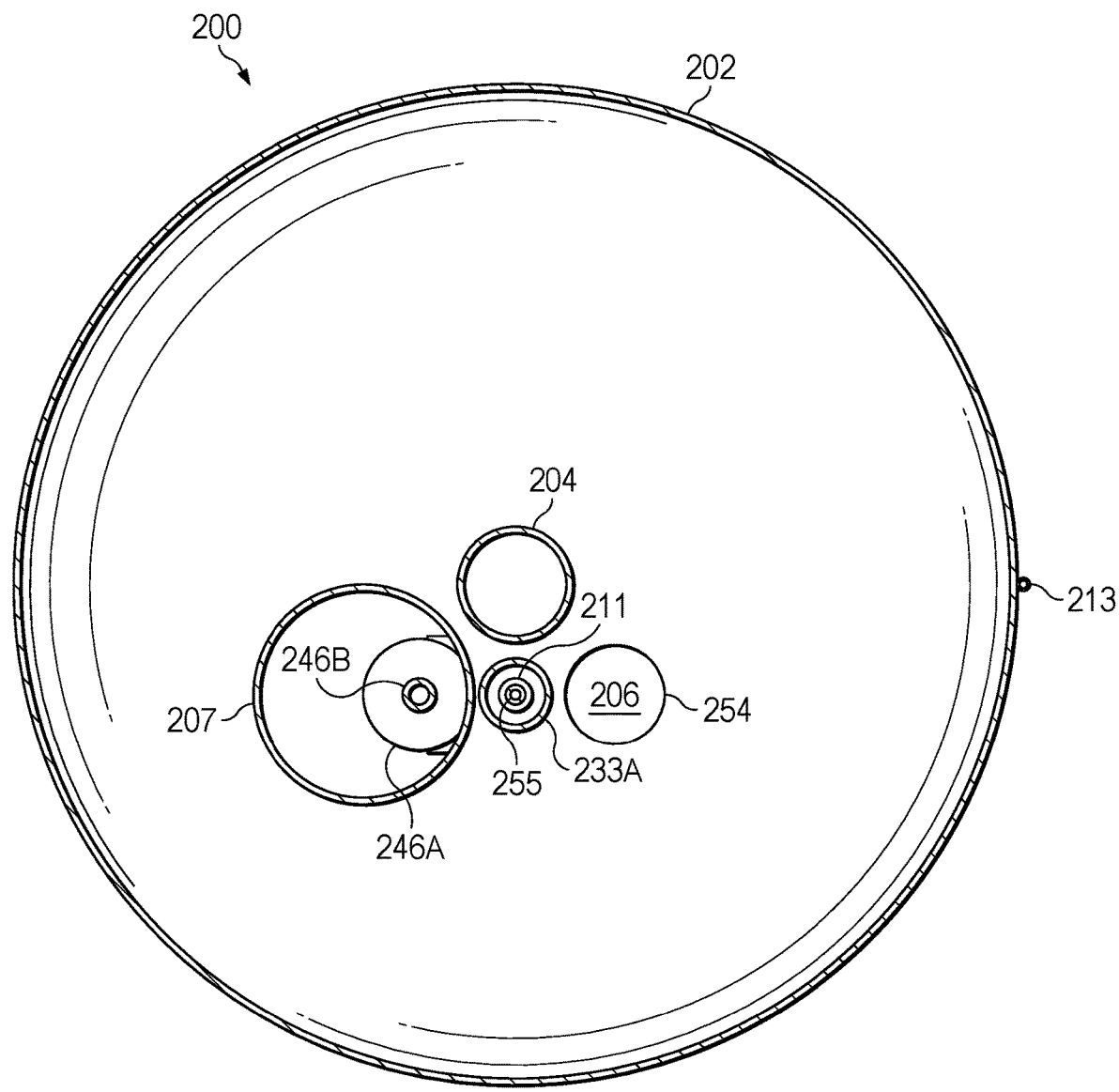
FIG. 21 is a top-down sectional view of the second embodiment of the present invention.

FIG. 21 illustrates a top-down sectional view of the same embodiment 200 of the current disclosure that is illustrated in FIGS. 12-20, where the section is taken along the section line 21-21 specified in FIG. 19.

Water flows into turbine inlet pipe 206 through an upper aperture 254 of that pipe.

Visible within reservoir-stabilizing trompe air ingestion pipe 211 is the throat 255, and/or most-highly constricted portion, of that reservoir-stabilizing trompe air ingestion pipe.

Figure 22:
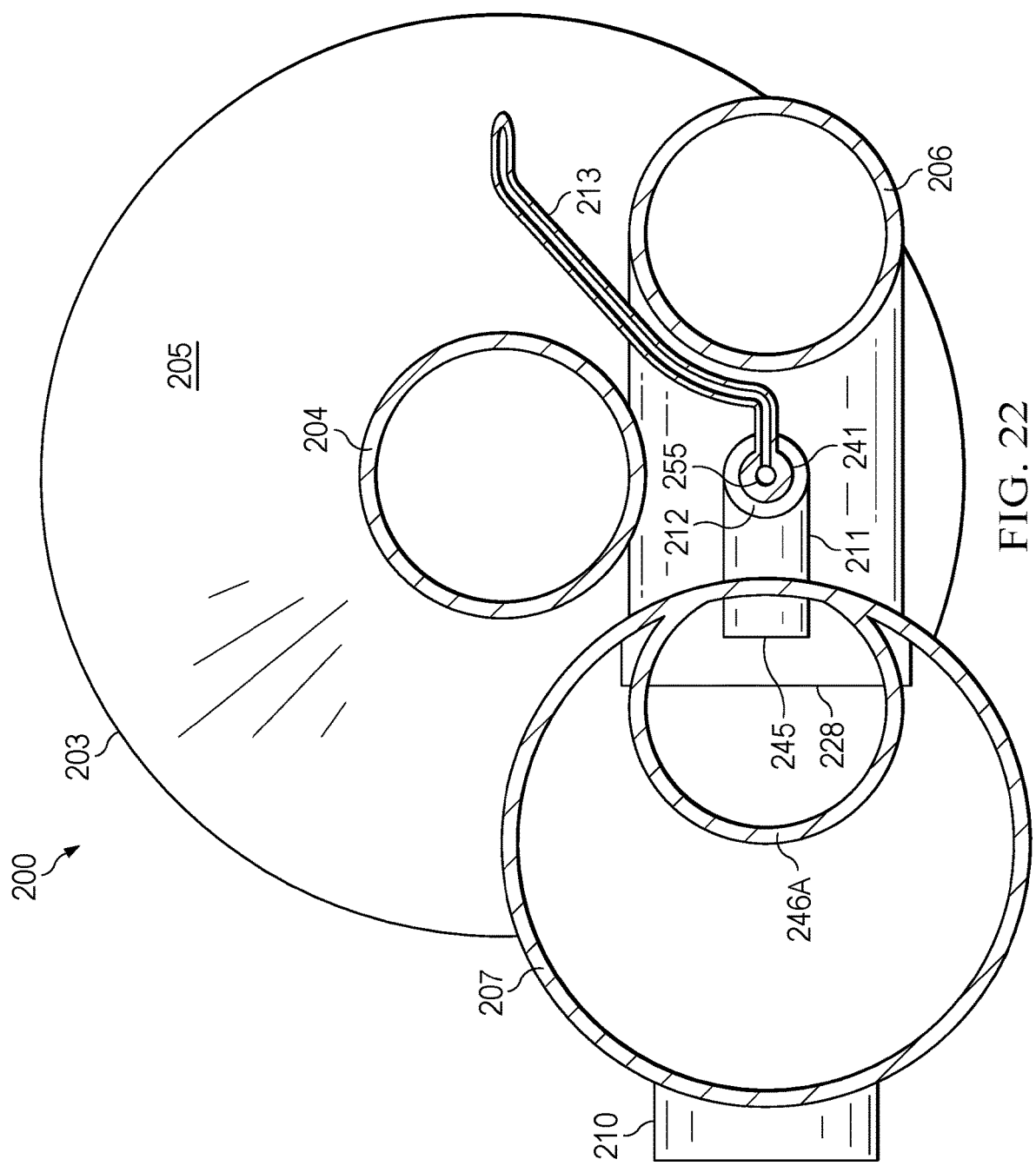
FIG. 22 is a top-down sectional view of the second embodiment of the present invention.

FIG. 22 illustrates a top-down sectional view of the same embodiment 200 of the current disclosure that is illustrated in FIGS. 12-21, where the section is taken along the section line 22-22 specified in FIG. 19.

Visible within FIG. 22 is the fluid connection between the throat 255 of the air ingestion pipe 211 and the air supply pipe 213.

While the foregoing disclosure has described various embodiments, it is understood that the invention is not limited to any specific embodiment or depiction herein. A person of ordinary skill in the art would readily appreciate modifications and substitutions herein, and the scope of the invention includes all such modifications and substitutions. Accordingly, the scope of the invention should not be construed to be limiting by the foreign description except where expressly so stated, but rather the invention's scope is properly determined by the appended claims, using the common and ordinary meanings of the words therein consistent with, but not limited by, the descriptions and figures of this disclosure.

We claim:

1. A hydrodynamic-pump, comprising:
   a hollow buoyant reservoir;
   an injection tube fluidly coupled to the hollow buoyant reservoir, the injection tube configured to impel water into the hollow buoyant reservoir when a portion of the injection tube oscillates vertically beneath a waterline;
   a pipe having an inlet fluidly coupled to an interior of the hollow buoyant reservoir, the pipe having an outlet, and the pipe configured to remove water from the hollow buoyant reservoir;
   a chamber fluidly coupled to the outlet of the pipe and to the hollow buoyant reservoir, the chamber comprising a fluid drain aperture;
   an air ingestion pipe coupled to the hollow buoyant reservoir and to the chamber; and
   an air inlet conduit coupled to the air ingestion pipe.

2. The hydrodynamic-pump of claim 1, wherein the fluid drain aperture is configured to remove water from and add water to the chamber.

3. The hydrodynamic-pump of claim 1, wherein the pipe is a turbine inlet pipe, the hydrodynamic-pump further comprising a water turbine in the turbine inlet pipe.

4. The hydrodynamic-pump of claim 3, wherein the water turbine is located at a lowermost position of the turbine inlet pipe.

5. The hydrodynamic-pump of claim 1, wherein the fluid drain aperture has a transverse cross-sectional area less than a horizontal cross-sectional area of the chamber.

6. The hydrodynamic-pump of claim 1, wherein the fluid drain aperture is at a level in the chamber above a level of the outlet of the pipe.

7. The hydrodynamic-pump of claim 1, wherein the injection tube comprises a constricted portion.

8. The hydrodynamic-pump of claim 1, wherein the injection tube comprises a lower cylindrical section and an upper cylindrical section, and a frustoconical portion fluidly connecting the lower cylindrical section to the upper cylindrical section, the lower cylindrical section having a greater cross-sectional area than a cross-sectional area of the upper cylindrical section.

9. The hydrodynamic-pump of claim 1, wherein the air ingestion pipe includes a venturi section.

10. The hydrodynamic-pump of claim 9, wherein the air inlet conduit is coupled to the venturi section of the air ingestion pipe and to ambient air.

11. The hydrodynamic-pump of claim 1, further comprising: a separation gallery in the chamber and adjacent to an outlet of the air ingestion pipe.

12. The hydrodynamic-pump of claim 1, wherein the buoyant hollow reservoir is substantially spherical.

13. A hydrodynamic-pump, comprising:
    a hollow buoyant reservoir;
    an injection tube fluidly coupled to the hollow buoyant reservoir, the injection tube configured to impel water into the hollow buoyant reservoir when the injection tube oscillates vertically beneath a waterline;
    a pipe having an inlet fluidly coupled to the hollow buoyant reservoir, the pipe having an outlet, and the pipe configured to remove water from the hollow buoyant reservoir;
    an air ingestion pipe coupled to the hollow buoyant reservoir;
    a separation gallery coupled to the air ingestion pipe and fluidly coupled to the hollow buoyant reservoir; and
    an air inlet conduit coupled to the air ingestion pipe.

14. The hydrodynamic-pump of claim 13, wherein the pipe is a turbine inlet pipe, the hydrodynamic-pump further comprising:
    a water turbine in the turbine inlet pipe.

15. The hydrodynamic-pump of claim 14, wherein the water turbine is located at a lowermost position of the turbine inlet pipe.

16. The hydrodynamic-pump of claim 13, wherein the injection tube comprises a constricted portion.

17. The hydrodynamic-pump of claim 13, wherein the injection tube comprises a lower cylindrical section and an upper cylindrical section, and a frustoconical portion fluidly connecting the lower cylindrical section to the upper cylindrical section, the lower cylindrical section having a greater cross-sectional area than a cross-sectional area of the upper cylindrical section.

18. The hydrodynamic-pump of claim 13, wherein the air ingestion pipe includes a venturi section.

19. The hydrodynamic-pump of claim 18, wherein the air inlet conduit is coupled to the venturi section of the air ingestion pipe and to ambient air.

20. The hydrodynamic-pump of claim 13, wherein the buoyant hollow reservoir is substantially spherical.

21. A hydrodynamic-pump, comprising:
    a hollow buoyant reservoir;
    an injection tube fluidly coupled to the hollow buoyant reservoir, the injection tube configured to impel water into the hollow buoyant reservoir when the injection tube oscillates vertically beneath a waterline;
    a pipe having an inlet fluidly coupled to the hollow buoyant reservoir, the pipe having an outlet, and the pipe configured to remove water from the hollow buoyant reservoir;
    an effluent buffer chamber coupled to the hollow buoyant reservoir and to the pipe, the effluent buffer chamber configured to stabilize short-term or transient swings in net pressure of water flowing from the hollow buoyant reservoir and into the pipe; and
    a reservoir pressure-stabilizing trompe coupled to the hollow buoyant reservoir and coupled to the effluent buffer chamber and coupled to ambient air, the reservoir pressure-stabilizing trompe configured to continuously adjust an average pressure of an air pocket in the hollow buoyant reservoir so as to maintain an elevated rate of water effluence from the pipe, and to maintain an elevated rate of water addition to the hollow buoyant reservoir from the injection tube.

22. A hydrodynamic-pump, comprising:

a hollow buoyant reservoir;

an injection tube fluidly coupled to the hollow buoyant reservoir, the injection tube configured to impel water into the hollow buoyant reservoir when the injection tube oscillates vertically beneath a waterline;

a pipe having an inlet fluidly coupled to the hollow buoyant reservoir, the pipe having an outlet, and the pipe configured to remove water from the hollow buoyant reservoir; and a reservoir pressure-stabilizing trompe coupled to the hollow buoyant reservoir and coupled to ambient air, the reservoir pressure-stabilizing trompe configured to continuously adjust an average pressure of an air pocket in the hollow buoyant reservoir so as to maintain an elevated rate of water effluence from the pipe, and to maintain an elevated rate of water addition to the hollow buoyant reservoir from the injection tube.

\* \* \* \* \*